US012486139B2

(12) United States Patent
Henton

(10) Patent No.: US 12,486,139 B2
(45) Date of Patent: Dec. 2, 2025

(54) FISH TAPE TOOL

(71) Applicant: MILWAUKEE ELECTRIC TOOL CORPORATION, Brookfield, WI (US)

(72) Inventor: Nolan J. Henton, Milwaukee, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 369 days.

(21) Appl. No.: 18/248,563

(22) PCT Filed: Sep. 28, 2021

(86) PCT No.: PCT/US2021/052386
§ 371 (c)(1),
(2) Date: Apr. 11, 2023

(87) PCT Pub. No.: WO2022/081333
PCT Pub. Date: Apr. 21, 2022

(65) Prior Publication Data
US 2023/0406669 A1 Dec. 21, 2023

Related U.S. Application Data

(60) Provisional application No. 63/090,807, filed on Oct. 13, 2020.

(51) Int. Cl.
*B65H 75/40* (2006.01)
*B65H 75/44* (2006.01)
*H02G 1/08* (2006.01)

(52) U.S. Cl.
CPC ....... *B65H 75/406* (2013.01); *B65H 75/4471* (2013.01); *B65H 75/4484* (2013.01);
(Continued)

(58) Field of Classification Search
CPC .............. B65H 75/406; B65H 75/4471; B65H 75/4484; B65H 75/4486; B65H 2701/376; H02G 1/085
See application file for complete search history.

(56) References Cited

U.S. PATENT DOCUMENTS 2,556,484 A 6/1951 Raney
2,600,722 A 6/1952 Atkinson
(Continued)

FOREIGN PATENT DOCUMENTS

DE 102005021180 A1 11/2006
KR 101215454 B1 12/2012
(Continued)

OTHER PUBLICATIONS

International Search Report and Written Opinion for Application No. PCT/US2021/052386 dated Jan. 20, 2022 (11 pages).

*Primary Examiner* — Seahee Hong
(74) *Attorney, Agent, or Firm* — Michael Best & Friedrich LLP

(57) ABSTRACT

A fish tape tool includes a housing and a drum supported by the housing for rotation relative to the housing. The drum includes an inner surface that at least partially defines a fish tape storage zone. The inner surface is made of a first material having a first coefficient of friction. The fish tape tool also includes a fish tape positioned at least partially within the fish tape storage zone of the drum. The fish tape is dispensed or retracted from the drum as the drum rotates. The fish tape tool further includes a friction layer positioned on at least a portion of the inner surface of the drum. The friction layer has a second coefficient of friction that is greater than the first coefficient of friction.

18 Claims, 34 Drawing Sheets

(52) U.S. Cl.
CPC ......... *B65H 75/4486* (2013.01); *H02G 1/085* (2013.01); *B65H 2701/376* (2013.01)

(56) References Cited

U.S. PATENT DOCUMENTS

| | | | |
|---|---|---|---|
| 2,689,709 | A | 9/1954 | Waldschmidt |
| 2,743,884 | A | 5/1956 | Briggs |
| 2,750,152 | A | 6/1956 | Schinske |
| 2,913,222 | A | 11/1959 | Kuzara |
| 2,969,953 | A | 1/1961 | Shaw, Jr. |
| 3,145,927 | A | 8/1964 | Prouty |
| 3,145,972 | A | 8/1964 | Sweeney |
| 3,258,246 | A | 6/1966 | Turk et al. |
| 3,355,123 | A | 11/1967 | Schinske |
| 3,355,148 | A | 11/1967 | Botello et al. |
| 3,424,435 | A | 1/1969 | Niemann |
| 3,528,644 | A | 9/1970 | Scott |
| 3,582,044 | A | 6/1971 | Gardner |
| 3,601,330 | A | 8/1971 | Minobe |
| 3,744,006 | A | 7/1973 | O'Loughlin |
| 3,837,448 | A | 9/1974 | Hagstrom et al. |
| 3,858,848 | A | 1/1975 | Macfetrich |
| 4,413,808 | A | 11/1983 | Finkle |
| 4,917,362 | A | 4/1990 | Wilson |
| 5,056,731 | A | 10/1991 | Koehn |
| 5,106,056 | A | 4/1992 | Crates et al. |
| 5,423,516 | A | 6/1995 | Blaha |
| 5,505,432 | A | 4/1996 | Noonan |
| 5,609,311 | A | 3/1997 | Palm |
| 5,649,674 | A | 7/1997 | Cielker |
| 6,152,395 | A | 11/2000 | Corriveau et al. |
| 6,361,021 | B1 | 3/2002 | Brennan |
| 6,416,040 | B1 | 7/2002 | Bergman |
| 6,513,791 | B1 | 2/2003 | Yates |
| 6,598,860 | B2 | 7/2003 | Poole |
| 6,722,603 | B1 | 4/2004 | Atencio |
| 6,896,242 | B1 | 5/2005 | Konen |
| 7,025,333 | B1 | 4/2006 | Gianturco |
| 7,100,900 | B2 | 9/2006 | Radle et al. |
| 7,150,448 | B1 | 12/2006 | Swift |
| 8,496,229 | B1 | 7/2013 | Mayhall |
| 8,651,459 | B2 | 2/2014 | Axon et al. |
| 8,695,944 | B2 | 4/2014 | Riggins |
| 9,417,054 | B2 | 8/2016 | Moffatt et al. |
| 9,419,418 | B2 | 8/2016 | Passoni |
| 2002/0145029 | A1 | 10/2002 | Konen et al. |
| 2005/0062028 | A1 | 3/2005 | Konen |
| 2012/0168699 | A1 | 7/2012 | Rachminov et al. |
| 2014/0001306 | A1 | 1/2014 | Noumi et al. |
| 2015/0184469 | A1 | 7/2015 | Sherman |
| 2016/0096705 | A1 | 4/2016 | Ryals |
| 2019/0292005 | A1* | 9/2019 | Miller .................. B65H 75/406 |
| 2019/0292009 | A1 | 9/2019 | Gonsalves |
| 2019/0375606 | A1* | 12/2019 | O'Neal .................. B65H 75/32 |
| 2021/0078821 | A1 | 3/2021 | Miller et al. |
| 2021/0126438 | A1 | 4/2021 | Bowles |
| 2021/0163255 | A1 | 6/2021 | Miller et al. |
| 2021/0300712 | A1 | 9/2021 | Kosturko et al. |
| 2022/0102949 | A1 | 3/2022 | Miller et al. |

FOREIGN PATENT DOCUMENTS

| | | |
|---|---|---|
| KR | 1020140130624 A | 11/2014 |
| WO | 2005013668 A2 | 2/2005 |
| WO | 2005014451 A2 | 2/2005 |
| WO | 2006122129 A2 | 11/2006 |
| WO | 2010111801 A2 | 10/2010 |

* cited by examiner

FISH TAPE TOOL

CROSS REFERENCE TO RELATED APPLICATIONS

This application is a national stage filing under 35 U.S.C. § 371 of International Application No. PCT/US2021/052386, filed Sep. 28, 2021, which claims priority to U.S. Provisional Application No. 63/090,807, filed Oct. 13, 2020, which are hereby incorporated by reference herein.

FIELD OF THE INVENTION

The present invention relates to fish tape assemblies, and more particularly to fish tape tools and fish tape drums for use with fish tape tools.

BACKGROUND OF THE INVENTION

Fish tape tools are used to dispense and retract fish tape into conduits or walls. The moving end of the fish tape can be pushed toward an area where guide string has been arranged inside the conduit or wall, attached to the guide string, and then used to pull the guide string through the conduit or wall, such that a cable or wire can be pulled through the wall or conduit.

SUMMARY OF THE INVENTION

The present disclosure provides, in one aspect, a fish tape tool including a housing and a drum supported by the housing for rotation relative to the housing. The drum includes an inner surface that at least partially defines a fish tape storage zone. The inner surface is made of a first material having a first coefficient of friction. The fish tape tool also includes a fish tape positioned at least partially within the fish tape storage zone of the drum. The fish tape is dispensed or retracted from the drum as the drum rotates. The fish tape tool further includes a friction layer positioned on at least a portion of the inner surface of the drum. The friction layer has a second coefficient of friction that is greater than the first coefficient of friction.

The present disclosure provides, in another aspect, a fish tape tool including a fish tape, a housing including a housing sidewall having an exit aperture, and a drum positioned within the housing. The drum receives at least a portion of the fish tape. The drum is rotatable relative to the housing about an axis that is generally perpendicular to the housing sidewall to dispense or retract the fish tape. The drum includes a circumferential outer wall, a drum sidewall extending generally perpendicular to the axis, and an annular aperture formed in the drum sidewall and aligned with the exit aperture such that the fish tape can be dispensed and retracted through the annular aperture and the exit aperture.

The present disclosure provides, in another aspect, a fish tape tool including a motor and a drum coupled to the motor. The drum is operable to be rotated by the motor. The fish tape tool also includes a fish tape positioned at least partially within the drum. The fish tape is dispensed or retracted from the drum as the drum rotates. The fish tape tool also includes a motor current sensor coupled to the motor and configured to measure a current drawn by the motor while the motor rotates the drum, and a controller coupled to the motor current sensor. The controller is configured to deactivate the motor when the motor current sensor measures a current that exceeds a predetermined value.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
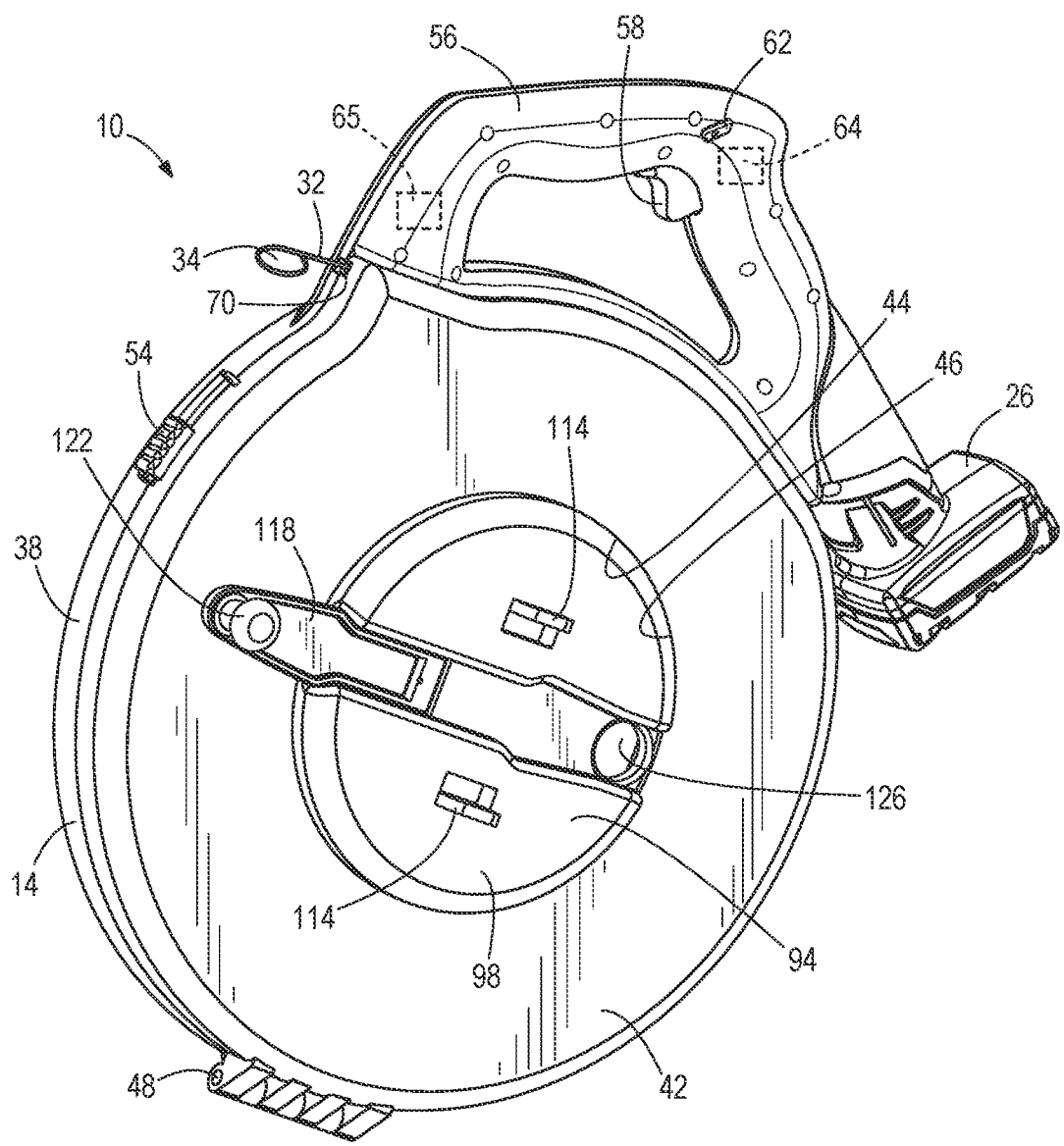
FIG. 1 is perspective view of a fish tape assembly.
Figure 2:
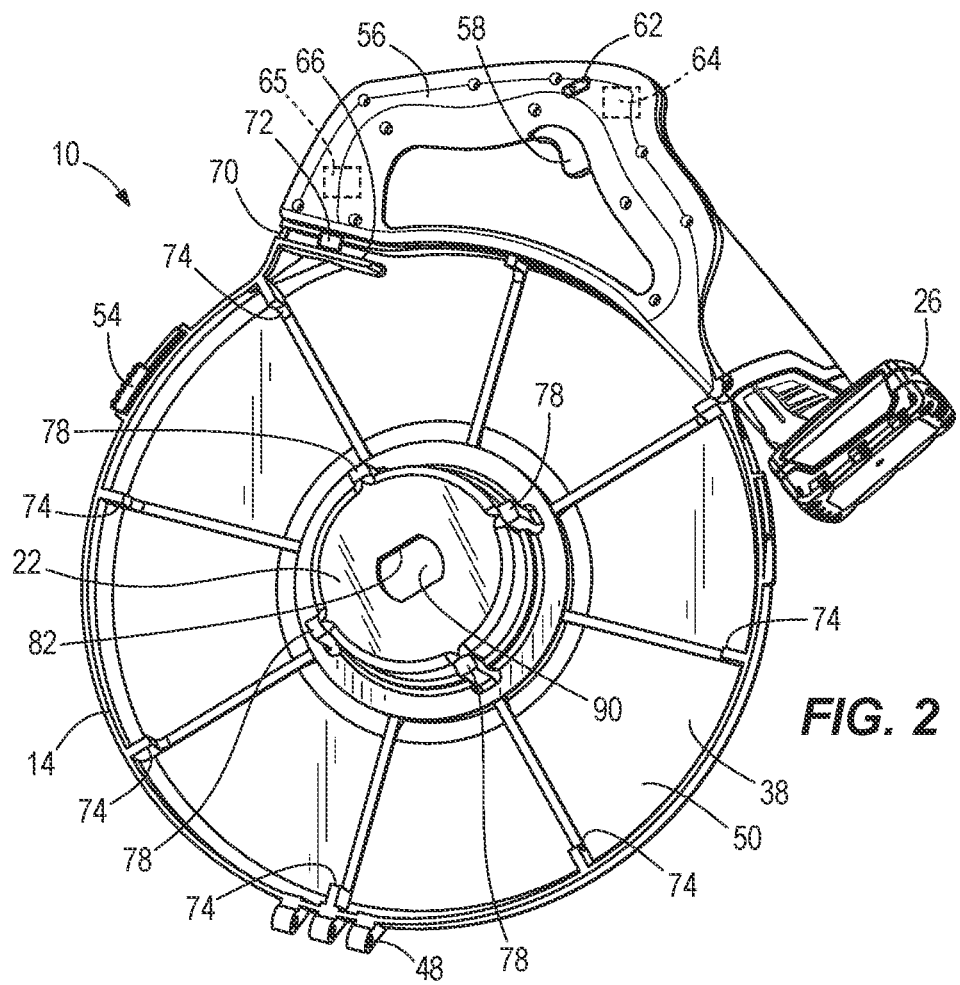
FIG. 2 is a perspective view of the fish tape assembly of FIG. 1, with portions removed.
Figure 3:
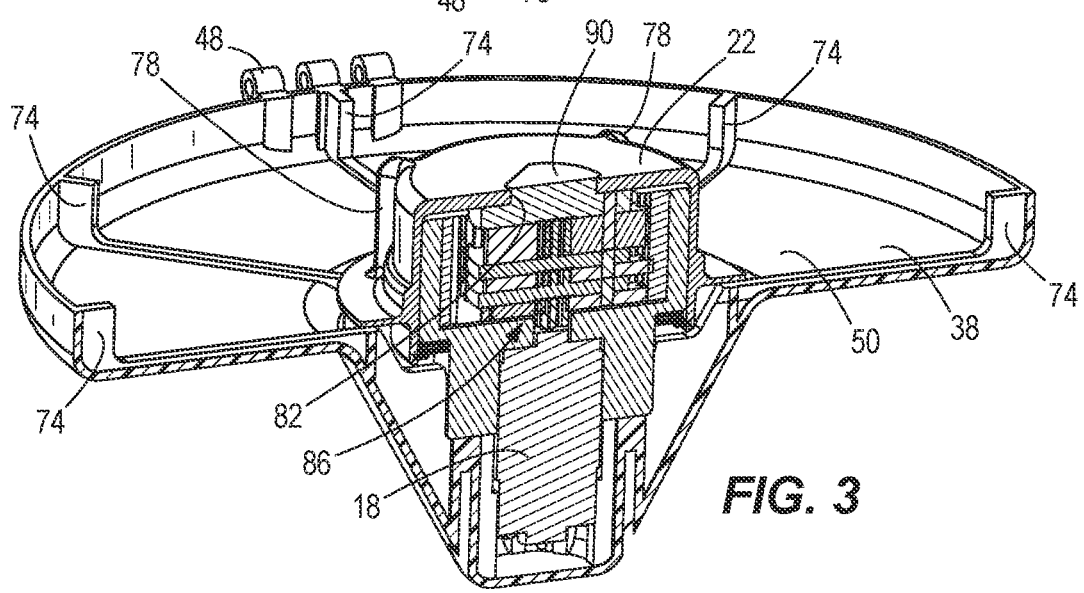
FIG. 3 is a cross-sectional view of the fish tape assembly of FIG. 1, with portions removed.

As shown in FIGS. 1-3, a fish tape assembly includes a fish tape tool 10 having a housing 14, a motor 18 (FIG. 3) for driving an output reel 22 (FIG. 2), and a selectively removable and rechargeable battery 26 for powering the motor 18. The fish tape tool 10 receives a fish tape drum 30 (FIG. 6) that contains a length of fish tape 32 having a moving end 34 extending out of the fish tape drum 30 and the fish tape tool 10. As explained further below, when the fish tape drum 30 is received in the fish tape tool 10, the output reel 22 can rotate to move the moving end 34 out of or into the housing 14.

As shown in FIGS. 1 and 2, the housing 14 includes a base 38 and a door 42 having an inner edge 44 defining an aperture 46. The door 42 is pivotably coupled to the base 38 via a hinge joint 48. An interior chamber 50 is defined within the housing 14. The door 42 moves with respect to the base 38 between a closed position (FIG. 1), in which the interior chamber 50 is not accessible, and an open position, in which the interior chamber 50 is accessible. The open position is shown in FIG. 2, with the door 42 removed for clarity, and in FIGS. 12 and 13. A latch 54 on the base 38 is slideable between a locked position, in which the door 42 is locked in the closed position, and an unlocked position, in which the door 42 may be pivoted to the open position.

With continued reference to FIGS. 1 and 2, the housing 14 includes a handle 56 coupled to the base 38. The handle 56 includes a trigger 58 for actuating the motor 18 and a directional shuttle 62 that can slide between a dispensing position and a retracting position. In the dispensing position, the motor 18 and the output reel 22 rotate in a dispensing direction, such that the fish tape 32 is dispensed from the fish tape drum 30 (and tool 10). In the retracting position, the motor 18 and the output reel 22 rotate in a retracting direction that is opposite the dispensing direction, such that the fish tape 32 is retracted into the fish tape drum 30 (and tool 10). The handle 56 includes a light 64, such as an LED, that is illuminated when the trigger is depressed 58 to actuate the motor 18.

The fish tape tool 10 also includes a controller 65 for variably controlling the speed of the motor 18, and thus the speed at which the fish tape 32 is dispensed or retracted. In some embodiments, the controller varies the speed of the motor 18 in response to a degree of depression of the trigger. In some embodiments, the controller 65 varies the speed of the motor 18 based on pulse width modulation. In some embodiments, the fish tape tool 10 includes a potentiometer to vary the speed of the motor 18.

Figure 9:
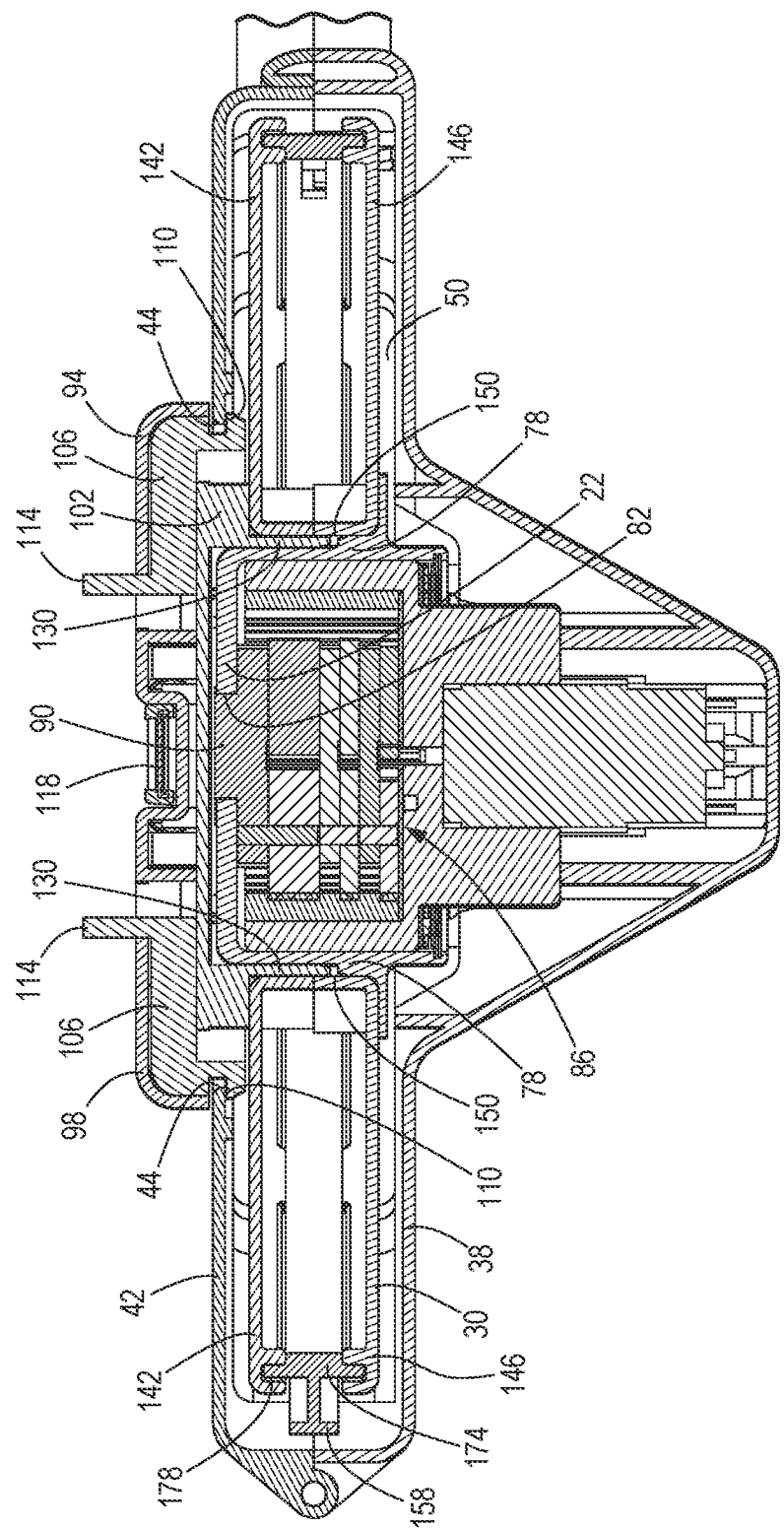
FIG. 9 is a cross-sectional view of the fish tape assembly of FIG. 1, with the fish tape drum of FIG. 6 inserted.

As shown in FIG. 2, the base 38 includes a channel 66 leading from the interior chamber 50 to an exit 70 out of the housing 14. The channel 66 includes a hall effect sensor 72, whose function will be described later herein. The base 38 also includes radially inward-extending ribs 74. With continued reference to FIG. 2, the output reel 22 includes radially outward-extending legs 78 and a keyway recess 82. As shown in FIGS. 3 and 9, the fish tape tool 10 includes a transmission 86 for transferring torque from the motor 18 to the output reel 22. The transmission 86 terminates in a drive key 90 arranged in the keyway recess 82, such that the output reel 22 can receive torque from the transmission 86, and thus rotate relative to the base 38. In some embodiments the transmission 86 includes a clutch mechanism. As explained in further detail below, the clutch mechanism is used to disconnect the output reel 22 from the transmission 86, such that torque cannot be transferred from the output reel 22 to the transmission 86.

Figure 4:
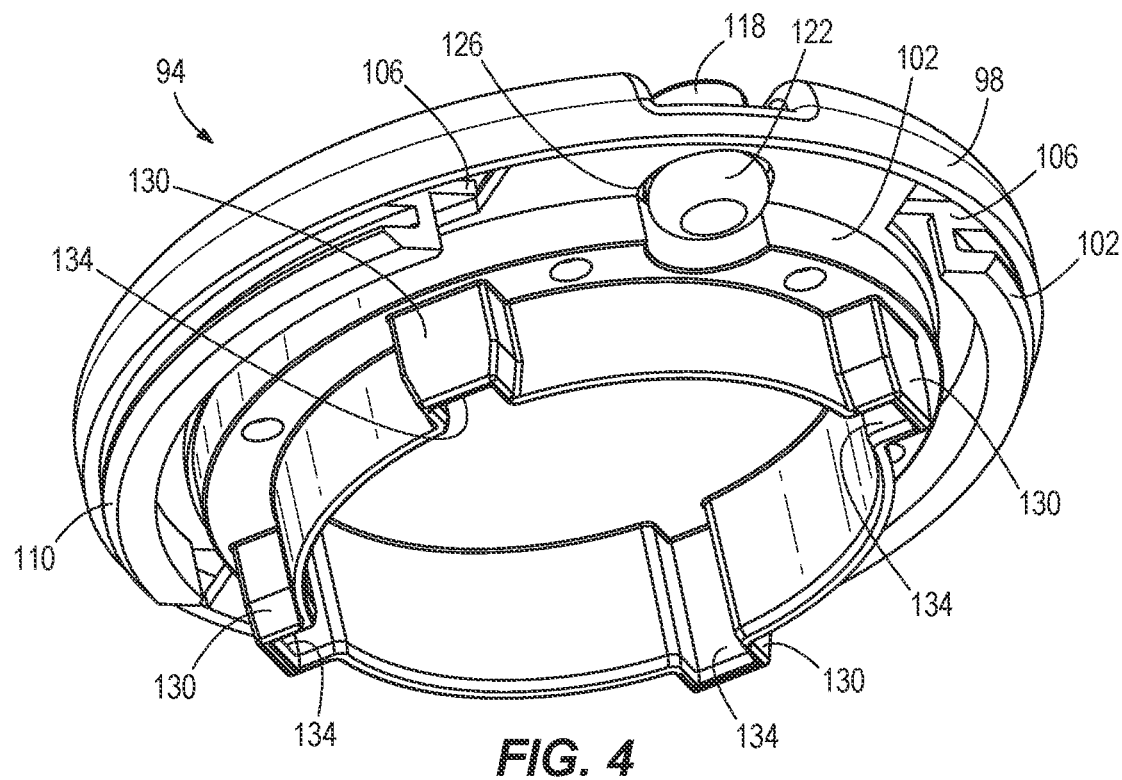
FIG. 4 is a bottom perspective view of a crank hub of the fish tape assembly of FIG. 1.
Figure 5:
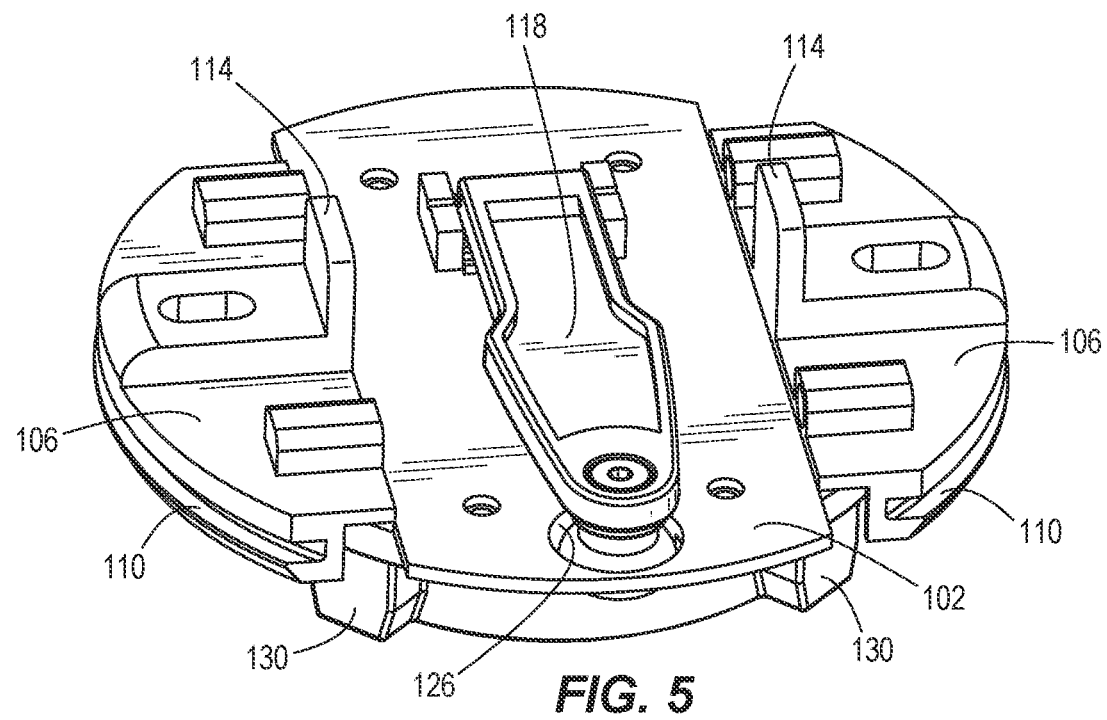
FIG. 5 is a top perspective view of a crank hub of the fish tape assembly of FIG. 1, with an outer shelf removed.

As shown in FIGS. 1, 4, and 5, the fish tape tool 10 includes a crank hub 94 including an outer shelf 98, an inner shelf 102, and a pair of detent members 106 between the outer and inner shelves 98, 102. The detent members 106 each include a radially outward-extending lip 110 and an axially extending tab 114. The detent members 106 are moveable between radially inward and outward positions, as explained in further detail below.

The outer shelf 98 includes a lever 118 moveable between an extended position shown in FIG. 1 and a collapsed position shown in FIG. 5. The lever 118 includes a detent 122 that is receivable in a recess 126 extending through the outer and inner shelves 98, 102, such that when the lever 118 is moved to the collapsed position of FIG. 5, the lever 118 is locked against the crank hub 94 unless an operator pulls the detent 122 out of the recess 126. As shown in FIG. 4, the inner shelf 102 includes radially outward-extending legs 130 in which radially outward-extending recesses 134 are defined on each leg 130. Thus, the crank hub 94 may be engaged for rotation with the output reel 22 by setting the legs 78 of the output reel 22 within the recesses 134 of the crank hub 94.

Figure 6:
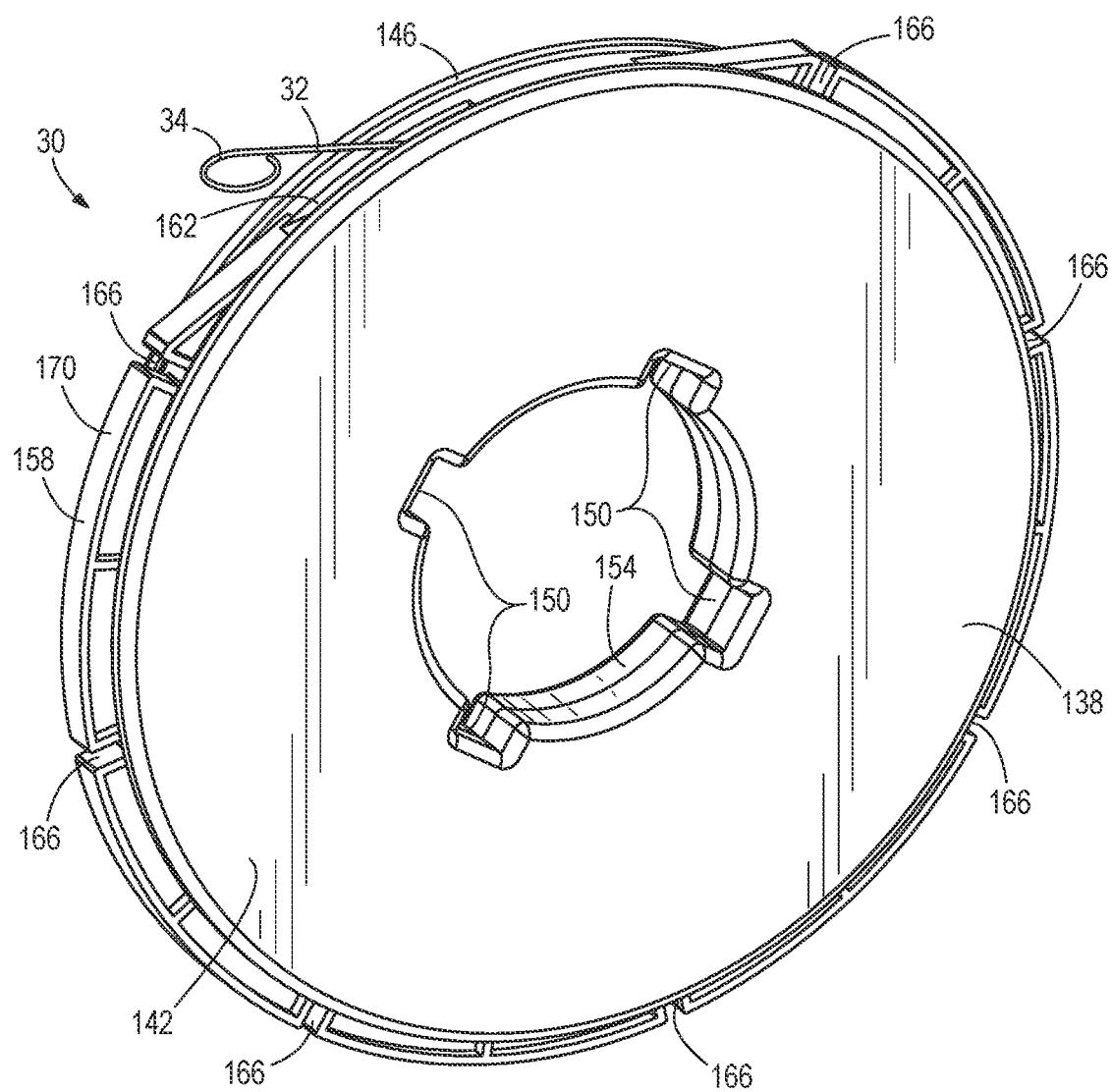
FIG. 6 is a perspective view of a fish tape drum of the fish tape assembly of FIG. 1.

As shown in FIG. 6, the fish tape drum 30 includes a drum portion 138 including first and second clamshells 142, 146. The drum portion 138 retains the length of fish tape 32 and defines radially outward-extending recesses 150 at an inner diameter 154 thereof. A frame 158 is arranged between the first and second clamshells 142, 146 of the drum portion 138 and defines an exit 162 for the fish tape 32. The frame 158 also defines radially inward-extending recesses 166 at an outer edge 170 thereof. As explained in further detail below, the drum portion 138 is rotatable relative to the frame 158.

This fish tape 32 includes an anchor end that is opposite of the moving end 34. The anchor end of the fish tape 32 is anchored within the drum portion 138 of the fish tape drum 30. In some embodiments, the anchor end of the fish tape 32 is anchored within the fish tape drum 30 at the inner diameter 154 of the drum portion 138 by a screw boss. Proximate the anchor end, the length of fish tape 32 includes a detectable element, such as a magnet that is detectable by the hall effect sensor 72 in the channel 66. Thus, during a dispensing operation, when a predetermined amount of fish tape 32 has been dispensed out from the fish tape tool 10, the magnet passes by the hall effect sensor 72, which sends a signal to the controller 65. In response to the signal, the controller 65 determines that the predetermined amount of fish tape 32 has been dispensed out of the fish tape tool, and alerts the operator, e.g. via a different color or flashing pattern from the light 64, that the predetermined amount of fish tape 32 has been dispensed.

Figure 7:
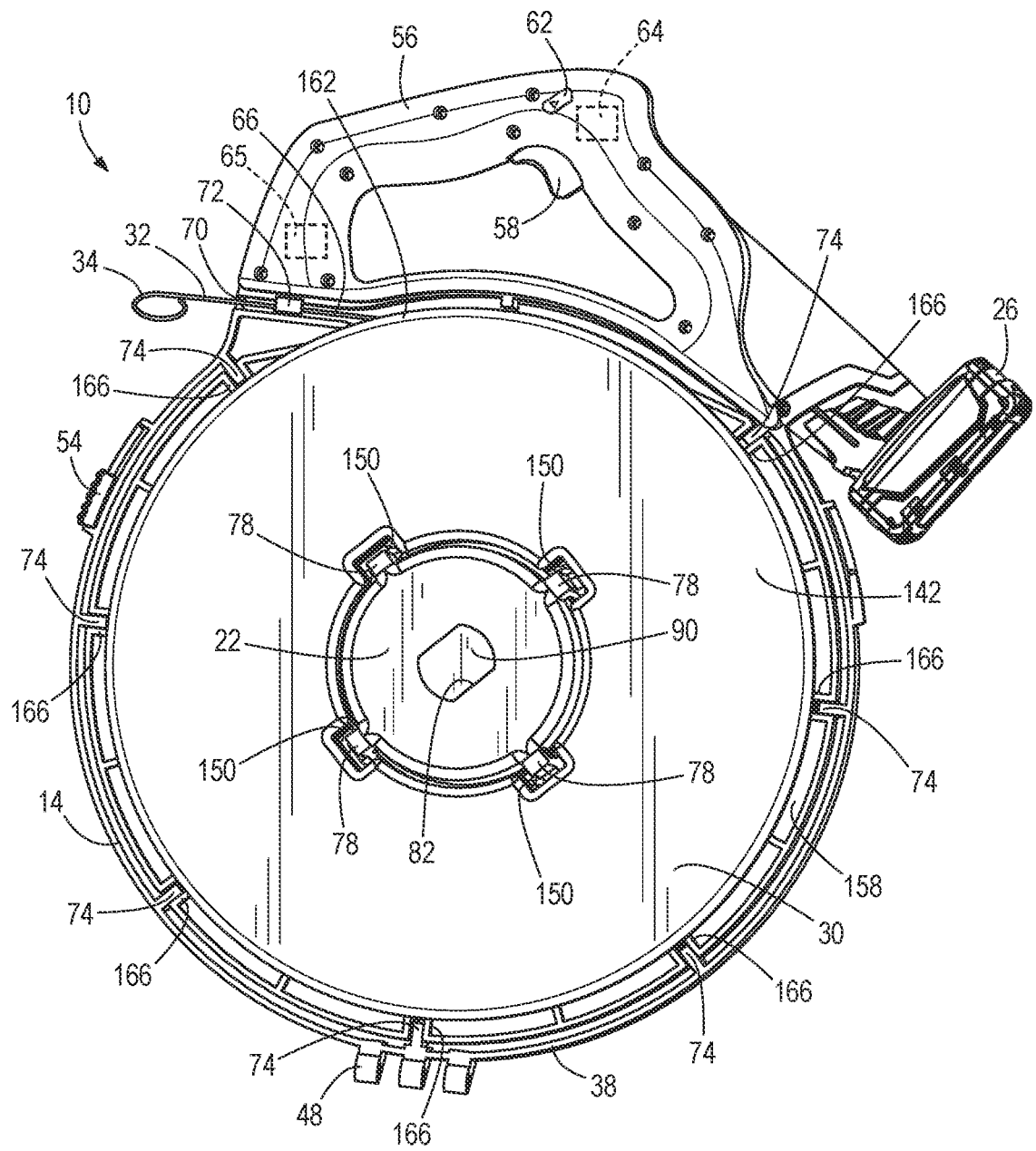
FIG. 7 is a plan view of the fish tape assembly of FIG. 1, with a door and a crank hub removed and the fish tape drum of FIG. 6 inserted.
Figure 8:
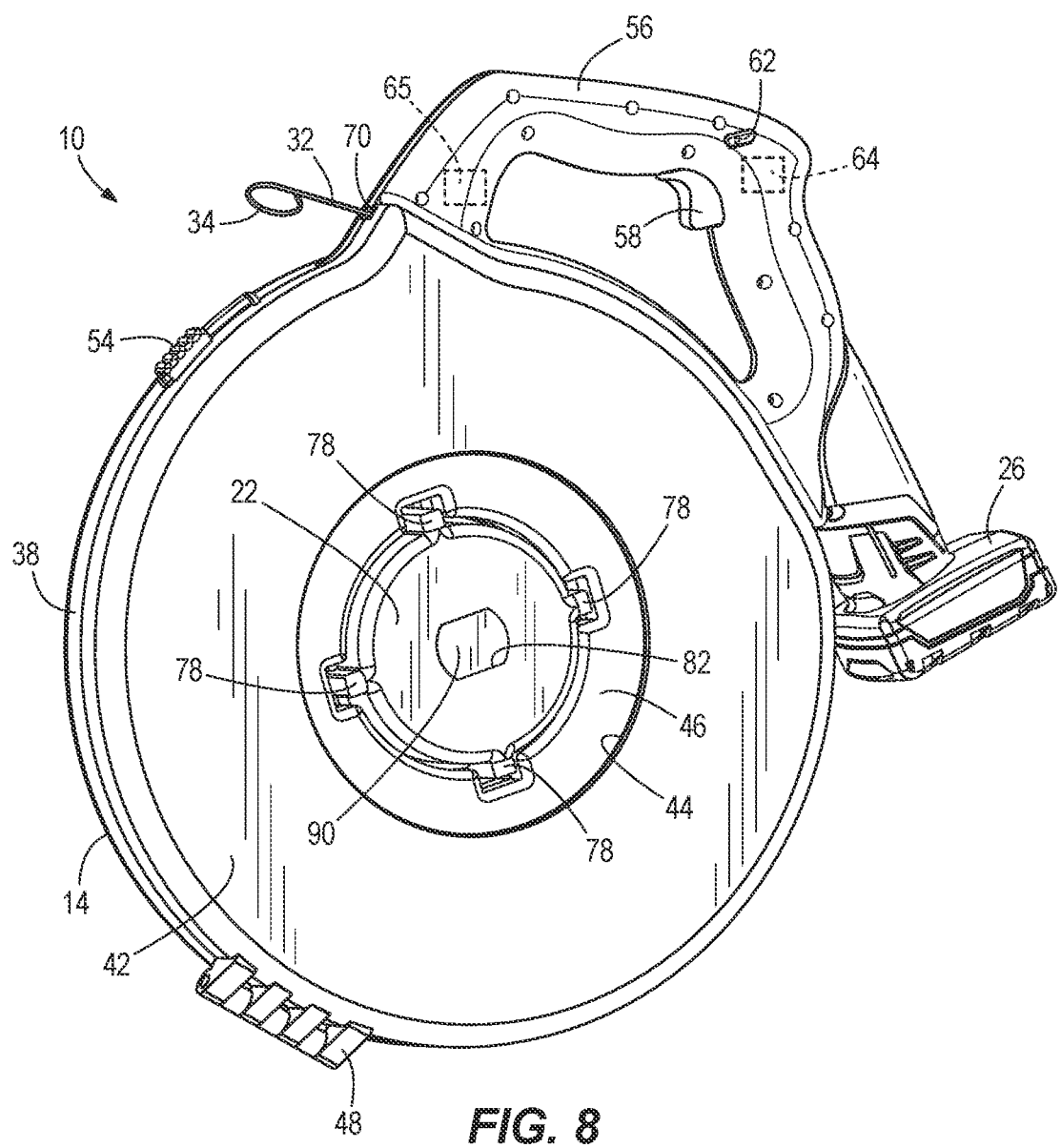
FIG. 8 is a perspective view of the fish tape assembly of FIG. 1, with the fish tape drum of FIG. 6 inserted and a crank hub removed.

To install the fish tape drum 30 in the fish tape tool 10, an operator slides the latch 54 to the unlocked position and then pivots the door 42 to the open position, as shown in FIG. 2. The operator then inserts the fish tape drum 30 into the interior chamber 50, aligning the exit 162 of the frame 158 with the channel 66 of the base 38 and the ribs 74 with the recesses 166 of the frame 158, as shown in FIG. 7. Thus, the frame 158 of the fish tape drum 30 is prevented from rotating with respect to the base 38. The operator then positions the fish tape 32 in the channel 66 and arranges the moving end 34 outside of the exit 70 of the housing 14, as shown in FIG. 7. The operator then closes the door 42 and moves the latch 54 to the locked position, thereby securing the fish tape drum 30 within the internal chamber 50 of the housing 14, as shown in FIG. 8. In some embodiments, the operator may now operate the fish tape tool 10 to dispense fish tape 32 from the housing 14 without insertion of the crank hub 94, because the legs 78 of the output reel 22 are positioned within the recesses 150 of the drum portion 138 of the fish tape drum 30. However, the subsequent operation described below will include insertion of the crank hub 94 into the housing 14 and operation therewith.

To insert the crank hub 94 into the housing 14, the operator pushes the tabs 114 of the detent members 106 of the crank member 94 radially inward, causing the detent members 106 to be held in a radially inward position (FIG. 9). The crank hub 94 may then be inserted through the aperture 46 of the door 42, in an alignment whereby the legs 78 of the reel output 22 are arranged in the recesses 134 of inner shelf 102 of the crank hub 94, and the legs 130 of the inner shelf 102 are received in the recesses 150 of the drum portion 138. Thus, the crank hub 94 is locked for rotation with the output reel 22 and the drum portion 138 is locked for rotation with the crank hub 94. Once the crank hub 94 has been inserted, the operator moves the tabs 114 outward, causing the detent members 106 to move to a radially outward position, such that the lips 110 are captured underneath the edge 44 of the door 42, as shown in FIG. 9. Thus, the crank hub 94 is axially locked with respect to the housing 14, and now prevented from slipping out of the aperture 46.

With continued reference to FIG. 9, the drum portion 138 is rotatable relative to the frame 150 by virtue of an inner edge 174 of the frame 158 being positioned within a channel 178 defined between the first and second clamshells 142, 146 of the drum portion 138. The length of fish tape 32 stored in the drum portion 138 has been omitted from FIG. 9 for clarity.

With the fish tape drum 30 and the crank hub 94 secured in the housing 14, the operator may now operate the fish tape tool 10. The operator slides the shuttle 62 to the dispensing position and depresses the trigger 58, thereby actuating the motor 18. The transmission 86 transmits torque from the motor 18 to the reel output 22 via the drive key 90 in the keyway recess 82. Because the legs 78 of the output reel 22 are arranged in the recesses 134 of the crank hub 94, and the legs 130 of the crank hub 94 are received in the recesses 150 of the drum portion 138, the crank hub 94 transmits rotation from the output reel 22 to the drum portion 138. As the drum portion 138 of the fish tape drum 30 rotates, the moving end 34 of the fish tape 32 is forced to move away from tool 10 and through, e.g., a conduit or wall.

As described above, if the operator completely depresses the trigger 58, the controller 65 causes the motor 18, and thus the fish tape 32, to move at a first, maximum speed. If the operator partially depresses the trigger 58, the controller 65 causes the motor 18, and thus the fish tape 32, to move a second speed that is slower than the first speed. While the operator is depressing the trigger 58 and the fish tape 32 is being dispensed, the light 64 is illuminated to indicate to the operator that fish tape is being dispensed. When the predetermined amount of fish tape 32 has been dispensed out from the fish tape tool 10, the magnet on the fish tape 32 passes by the hall effect sensor 72, which sends a signal to the controller 65. In response to the signal, the controller 65 alerts, e.g. via the light 64, the operator that the predetermined amount of fish tape 32 has been dispensed. With this notification, the operator releases the trigger 58, thus stopping the motor 18.

In order to retract the fish tape 32 back into the tool 10 and fish tape drum 30, the operator may slide the shuttle 62 to the retracting position, thus switching the rotational direction of motor 18 and fish tape drum 30, and operate the motor 18 to reel in the fish tape 32 by depressing the trigger 58. At some point during retraction, it is possible that the fish tape 32 may become entangled within a conduit or wall, or the moving end 34 may become caught or snagged. To prevent damage to the motor 18 and transmission 86, the controller 65 is capable of determining that the fish tape 32 has become entangled or snagged and in response, deactivates the motor 18. In some embodiments, the controller 65 monitors the current drawn by the motor 18 from the battery 26 during operation. If and when the fish tape 32 becomes snagged or entangled, the amount of current that the motor 18 draws will be above a predetermined threshold. The controller 65 detects that the current drawn is above the predetermined threshold, and in response deactivate the motor 18.

Instead of powered retraction, at some point the operator may switch the lever 118 to the extended position, as shown in FIG. 1, and crank the fish tape 32 back into the tool 10 manually, via the crank hub 94. Specifically, as the operator rotates the lever 118, and thus the crank hub 94, with respect to the housing 14, the drum portion 138 of the fish tape drum is also caused to rotate because the legs 130 of the crank hub 94 are locked in the recesses 150 of the drum portion 138. Rotation of the crank hub 94 also causes rotation of the output reel 22, because the legs 78 of the output reel 22 are arranged in the recesses 134 of the crank hub 94. In the illustrated embodiment, the lever 118 is used to overcome the cogging torque of the motor 18. In other words, as the crank hub 94 is manually rotated, the output reel 22 rotates and transfers torque back through the transmission 86.

In other embodiments, however, a clutch mechanism is included to decouple the output reel 22 from the transmission 86, allowing the output reel 22 to spin freely with respect to the transmission 86 when the crank hub 94 manually rotates the output reel 22. Thus, in embodiments with a clutch, torque is not transmitted back from the output reel 22 to the transmission 86 as the operator manually cranks the crank hub 94 with the lever 118. For instance, upon the lever 118 being moved to the extended position, the crank hub 94 may push the key 90 out of the keyway recess 82, such that the output reel 22 may rotate relative to the transmission 86 when it receives torque from manual rotation of the crank hub 94. Though manual operation of the tool 10 via the crank hub 94 is described here with respect to retracting the fish tape 32 into the tool 10, manual operation via the crank hub 94 can also be used to dispense fish tape 32 from the tool 10.

Once the fish tape 32 has been retracted into the tool 10, the operator may need to use a new fish tape drum 30 with a new type of fish tape 32 that is different from the current fish tape 32. For instance, the operator may need to change between conductive and non-conductive fish tape 32. Thus, the operator must remove the currently-installed fish tape drum 30.

Figure 10:
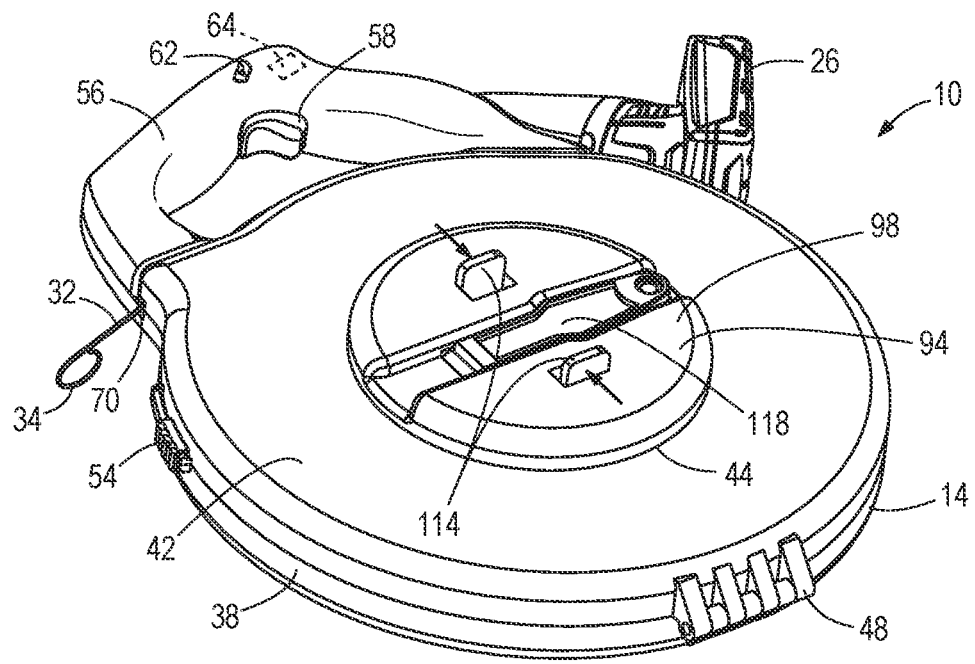
FIG. 10 is a perspective view of the fish tape assembly of FIG. 1, illustrating movement of detent members of a crank hub.
Figure 11:
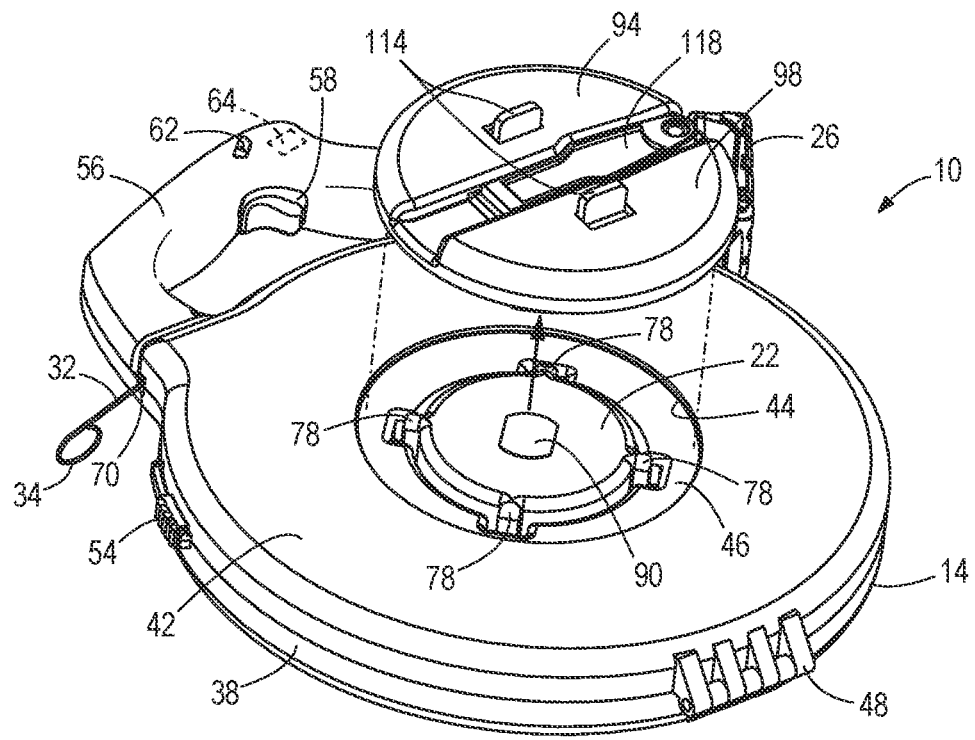
FIG. 11 is a perspective view of the fish tape assembly of FIG. 1, illustrating removal of a crank hub.
Figure 12:
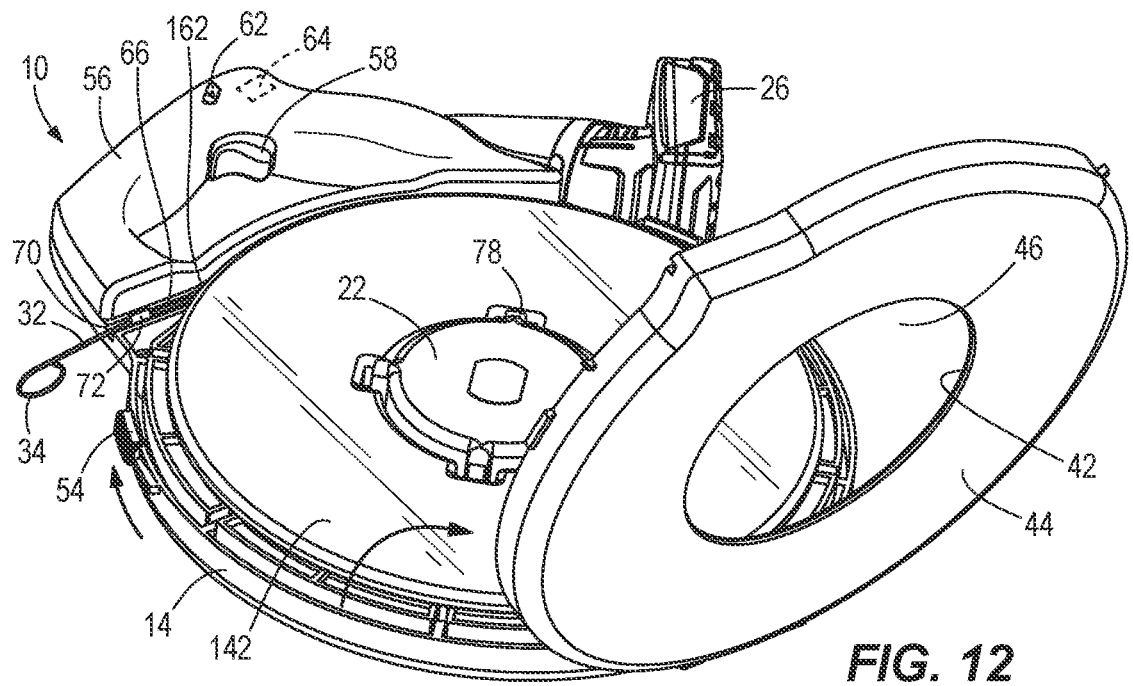
FIG. 12 is a perspective view of the fish tape assembly of FIG. 1, illustrating opening of a door.
Figure 13:
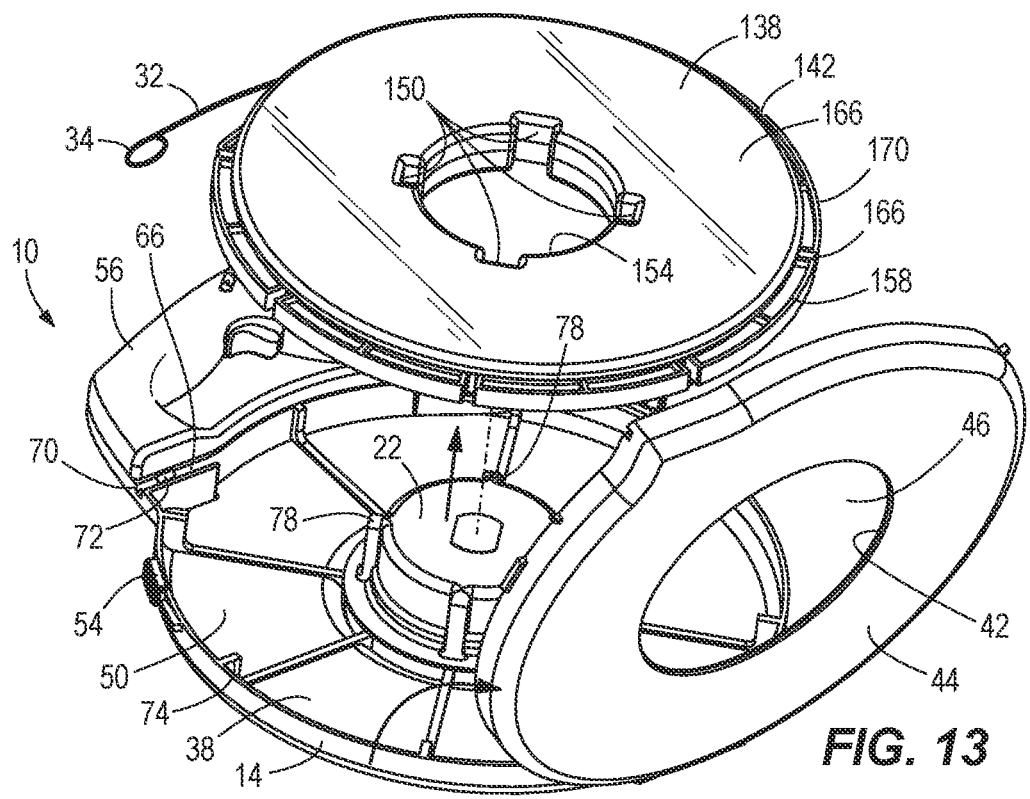
FIG. 13 is a perspective view of the fish tape assembly of FIG. 13, illustrating removal of the fish tape drum of FIG. 6.

To remove the fish tape drum 30, the operator moves the tabs 114 of the detent members 106 of the crank hub 94 radially inward, causing the detent members 106 to be held in a radially inward position, as shown in FIG. 10. The lips 110 of the detent members 106 are thus moved radially inward of edge 44, allowing the crank hub 94 to be removed from the aperture 46 of the door 42, as shown in FIG. 11. The latch 54 is then moved to the unlocked position, allowing the door 42 to be moved to the open position, as shown in FIG. 12. The operator is then able to remove the fish tape drum 30, as shown in FIG. 13, and replace it with a different fish tape drum 30, as described above.

FIGS. 14-17, 19, 31 and 33 illustrate a different embodiment of a fish tape drum 182. The fish tape drum 182 includes a drum portion 186 including first and second clamshells 190, 194. The first and second clamshells 190, 194 are each separately and rotatably supported by a frame 202 of the fish tape drum 182. A length of fish tape 196 (omitted in FIGS. 15-17 and FIG. 33 for clarity) is retained between the first and second clamshells 190, 194 of the drum portion 186. Each of the first and second clamshells 190, 194 of the drum portion 186 defines radially outward-extending recesses 198 that serve the same function as the recesses 150 of the drum portion 138 of fish tape drum 30. The first and second clamshells 190, 194 of the drum portion 186 are jointly rotatable relative to the frame 202 in the same manner as the drum portion 138 is rotatable relative to the frame 158 of the fish tape drum 30, as explained above, in order to dispense or retract the fish tape 196 from or into the fish tape drum 182.

Figure 31:
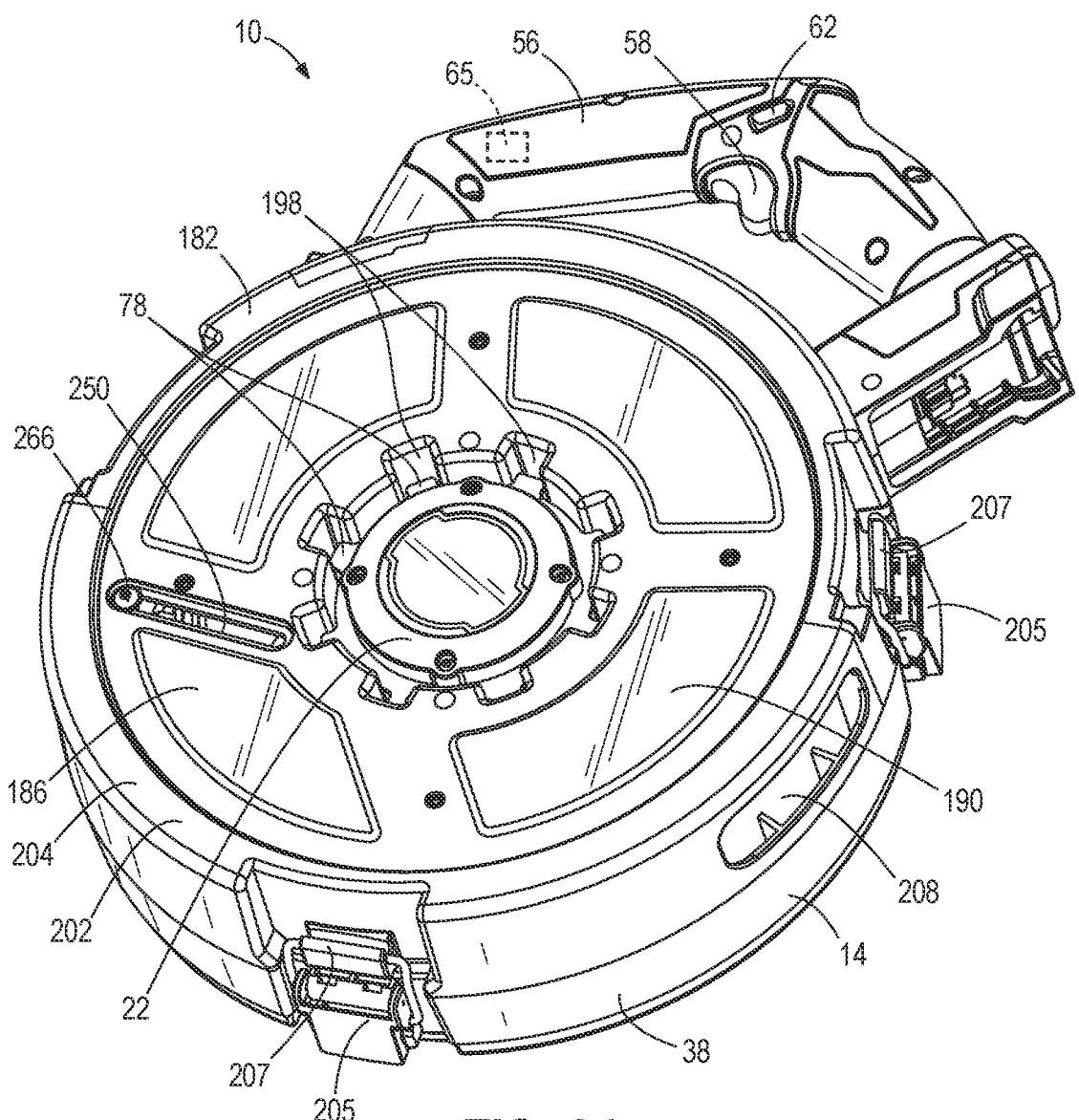
FIG. 31 is a perspective view a fish tape assembly according to another embodiment.
Figure 32:
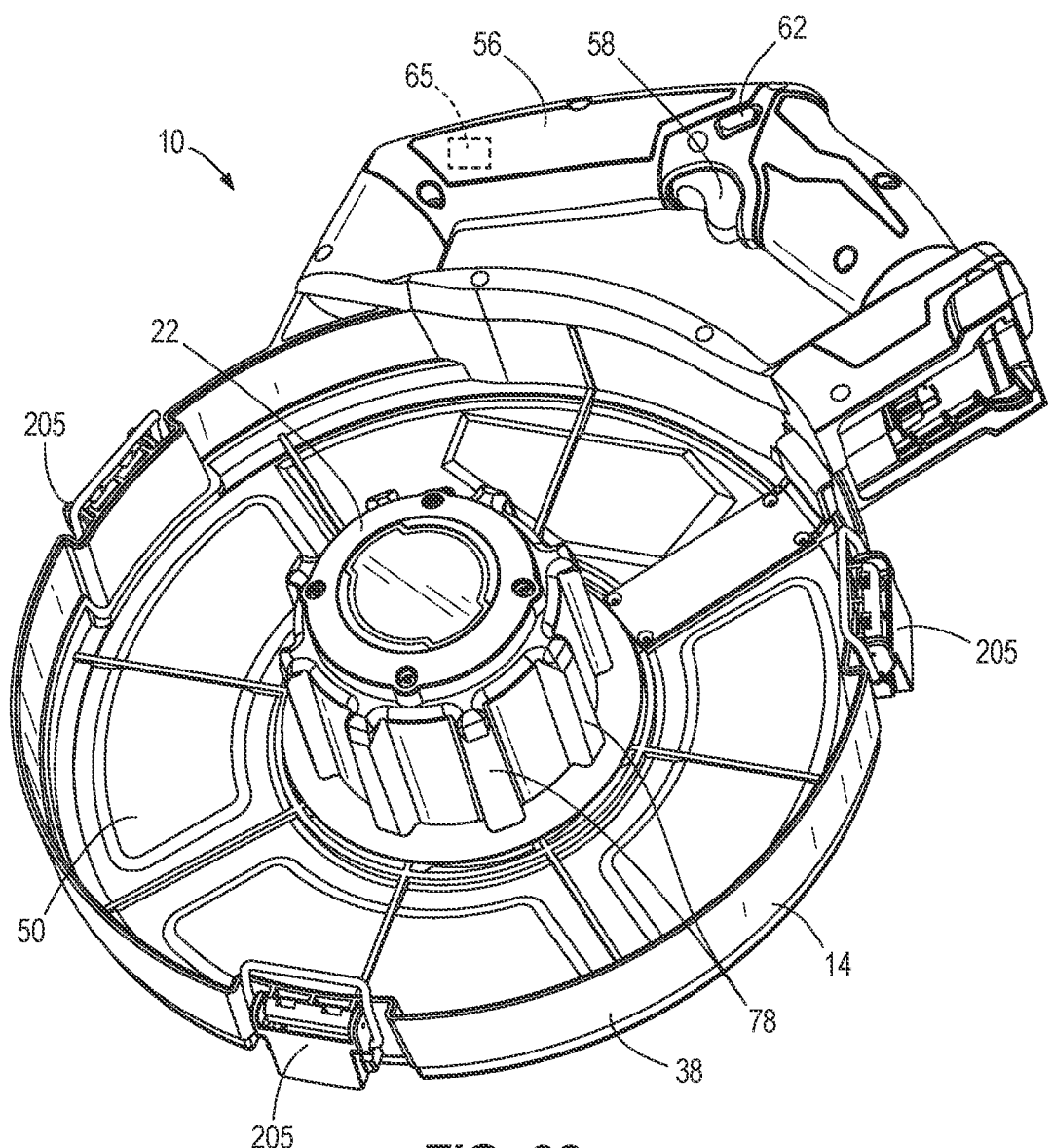
FIG. 32 is a perspective view of the fish tape assembly of FIG. 31, with a fish tape drum removed.
Figure 33:
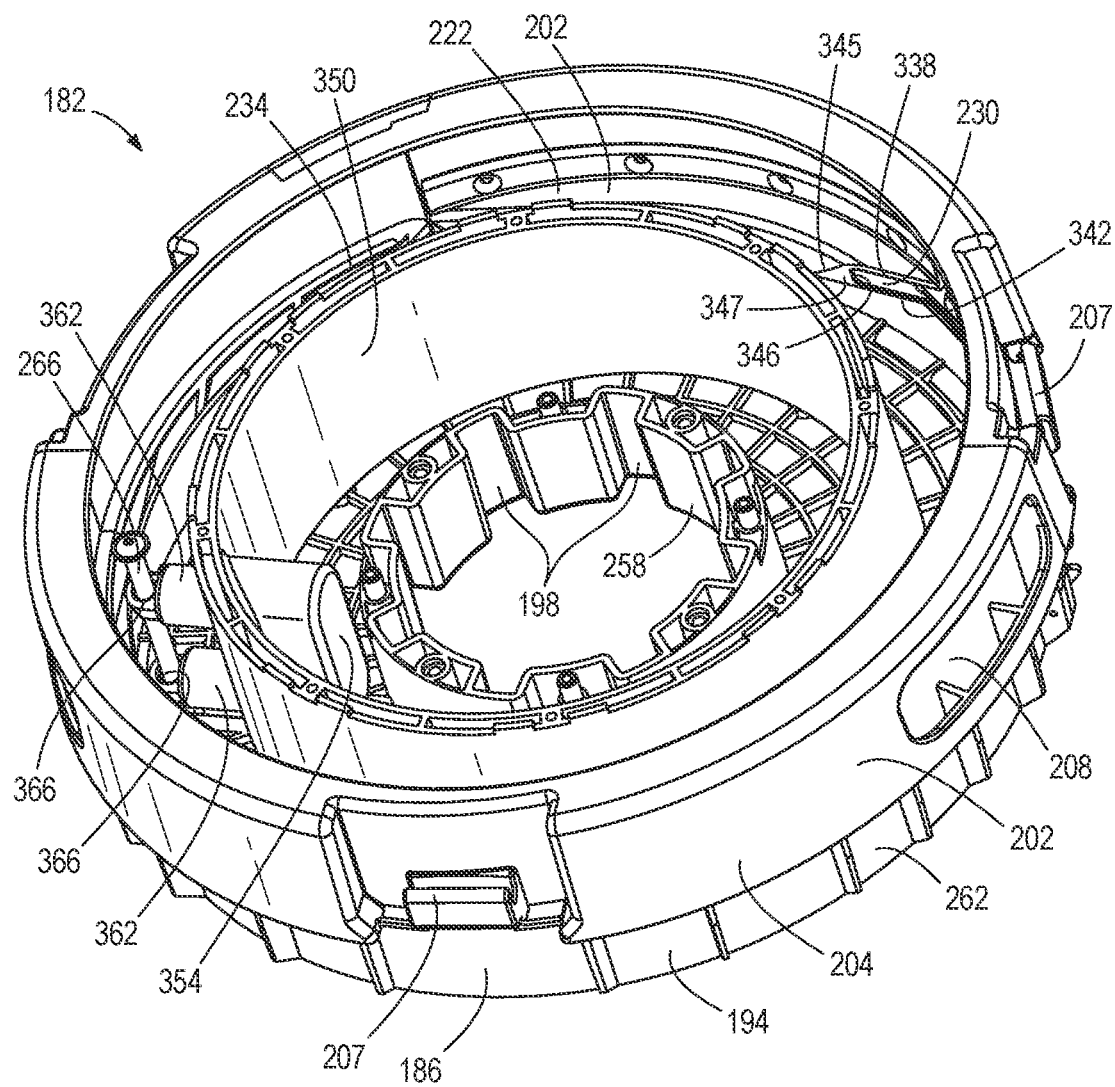
FIG. 33 is a perspective view of a fish tape drum of the fish tape assembly of FIG. 31, with portions removed.

As shown in FIGS. 14, 19 and 31 and 33 the frame 202 may include a shelf portion 204. Thus, in the embodiments of FIGS. 14-17 and 19 and 31-33, the fish tape tool omits door 42 as shown in FIG. 32 and instead, when the fish tape drum 182 is received in the interior chamber 50, the shelf portion 204 of the frame 202 rests on the base 38 of the housing 14 of the tool 10, as shown in FIG. 31. Latches 205 on the fish tape tool 10, such as over-center latches, are used to secure the shelf portion 204 to the base 38 in order to prevent the fish tape drum 182 from slipping out of the base 38. As shown in the embodiment of FIGS. 31-33, the shelf portion 204 includes hooks 207 engagable by the latches 205 and gripping recesses 208 graspable by the operator to insert or remove the fish tape drum 182 into the interior chamber 50 of the fish tape tool 10. Also, in the embodiments of FIGS. 14-17 and 19 and 31-33, the crank hub 94 is omitted and thus, the output reel 22 rotates the drum portion 186 of the fish tape drum 182 directly, via the arrangement of legs 78 of the output reel 22 in the recesses 198 of the drum portion 186.

Figure 14:
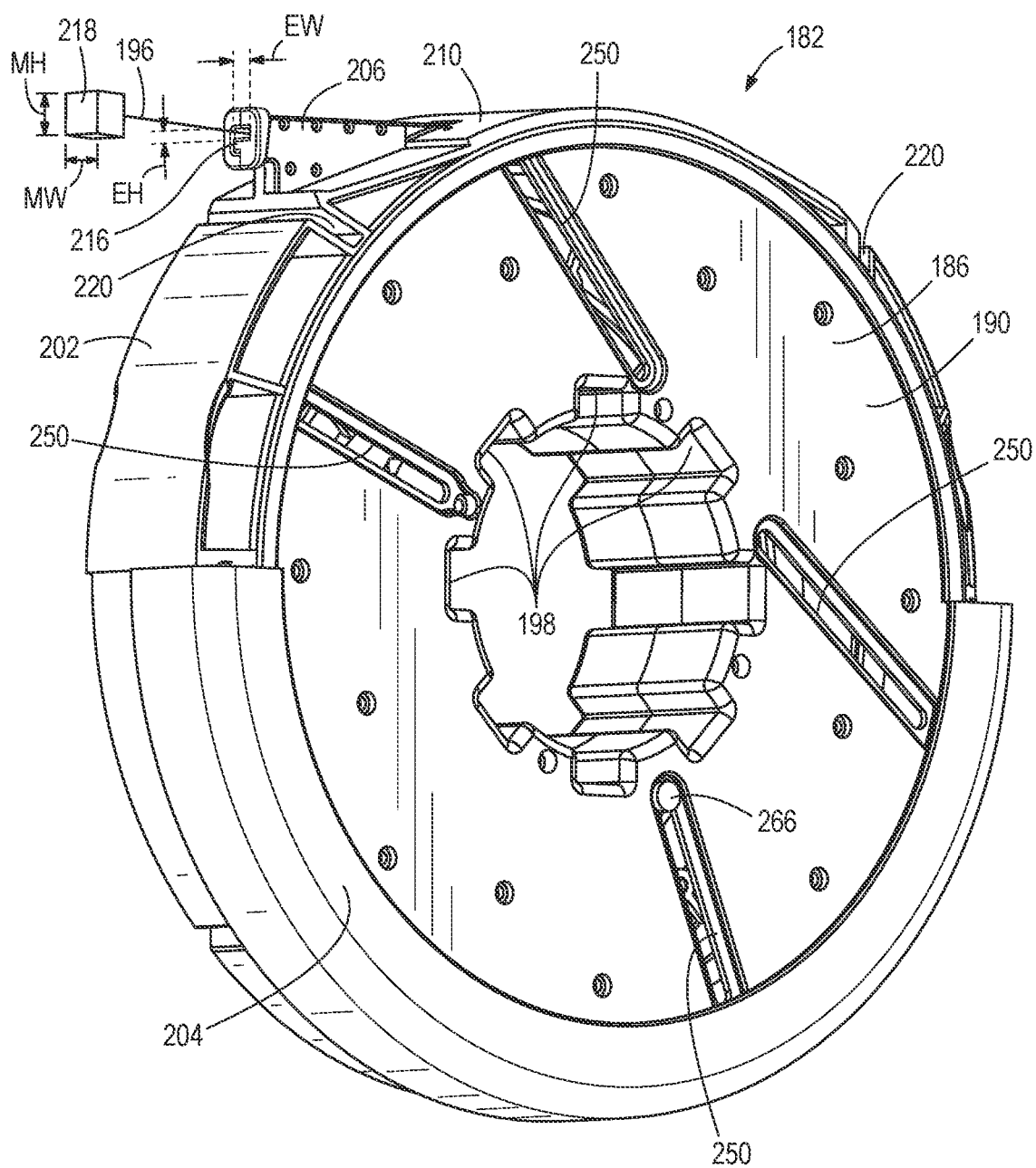
FIG. 14 is a perspective view of a fish tape drum according to another embodiment, with portions removed.
Figure 15:
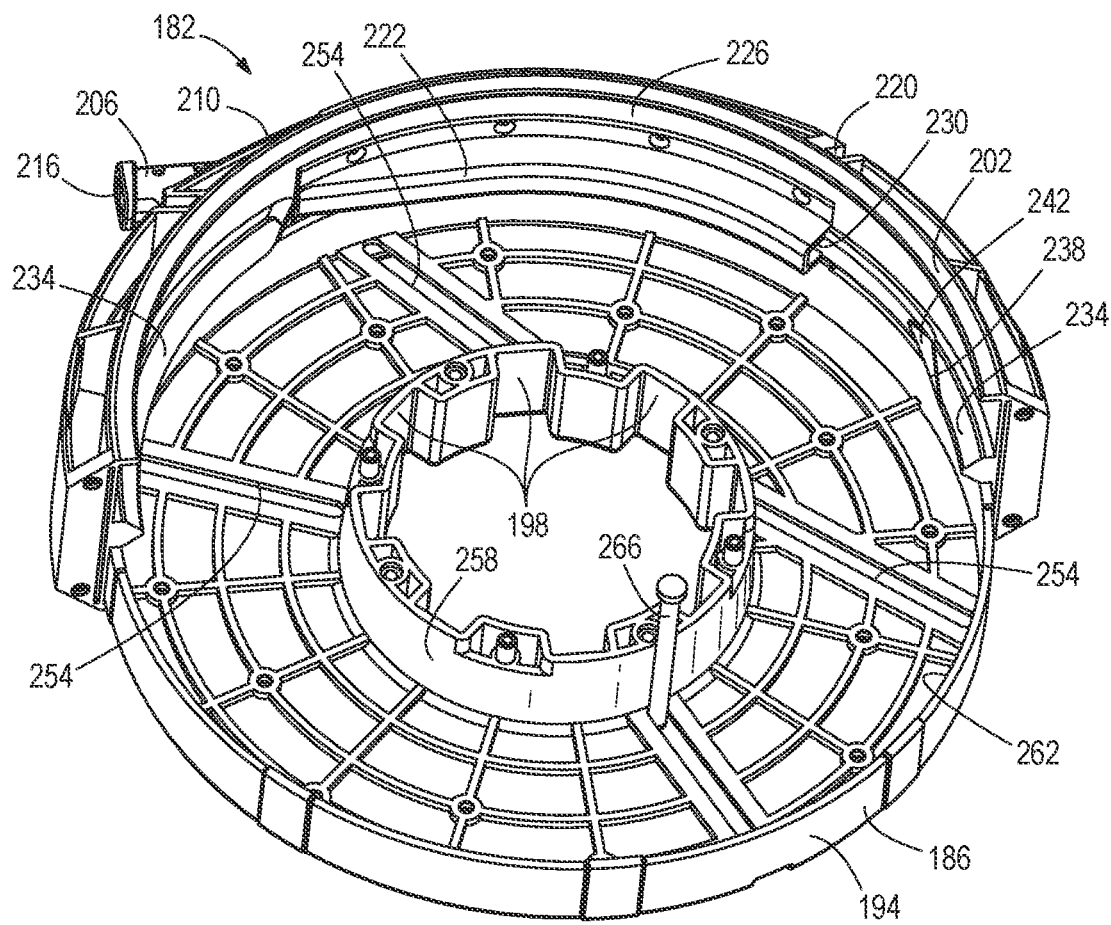
FIG. 15 is a perspective view of the fish tape drum of FIG. 14, with portions removed.
Figure 17:
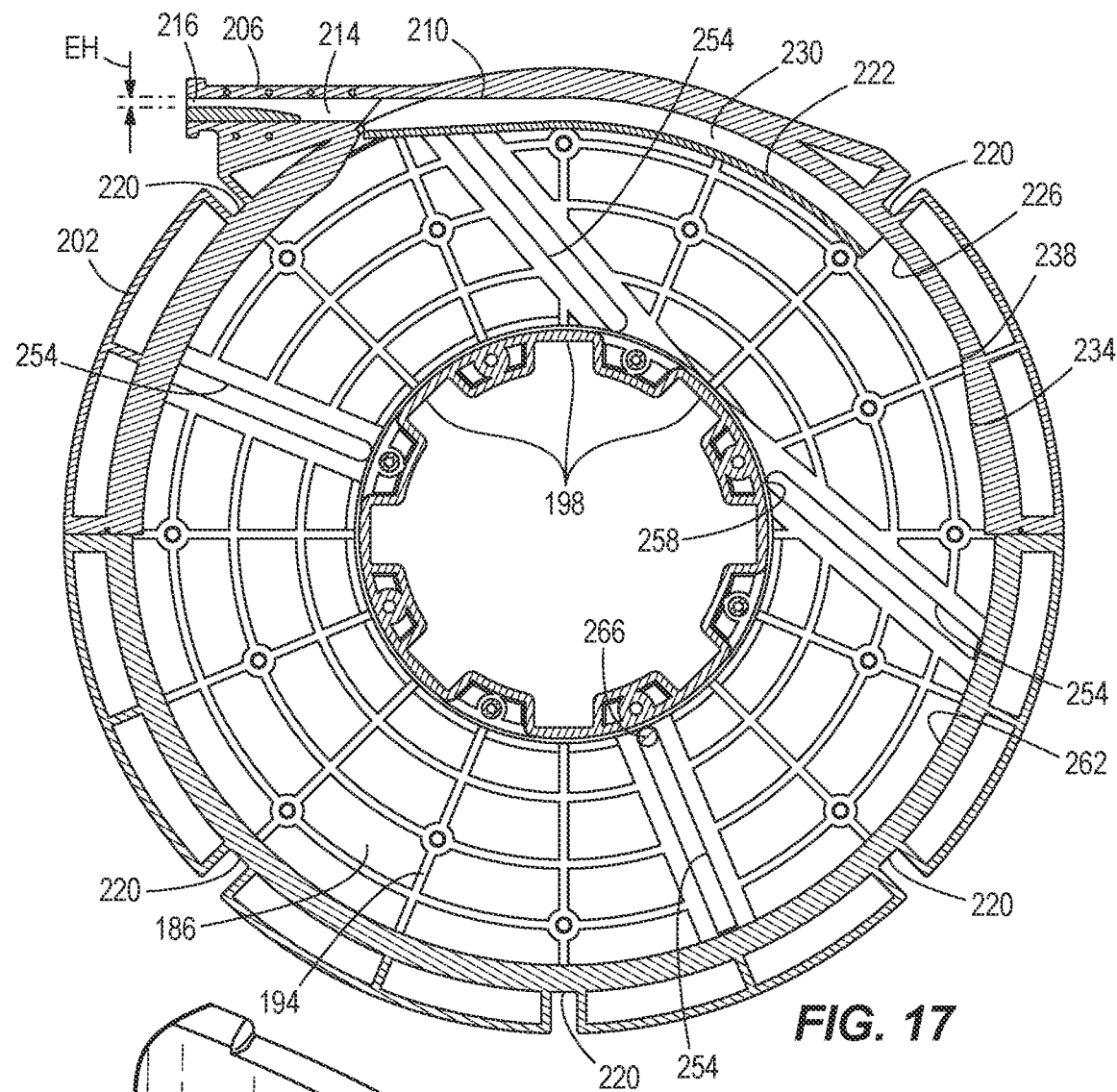
FIG. 17 is a cross-sectional view of the fish tape drum of FIG. 14.

With reference to FIGS. 14, 15 and 17, the frame 202 includes a nozzle 206 extending from an external surface 210 of the frame 202 and including a nozzle channel 214 defining an exit 216 for the fish tape 196. With reference to FIGS. 14 and 17, the exit 216 of the nozzle channel 214 has an exit width EW and an exit height EH. At least one of the exit width EW and the exit height EH are respectively less than a moving end height MH and a moving end width MW of a moving end 218 of the fish tape 196, which is arranged outside the fish tape drum 182. Thus, the moving end 218 is prevented from entering exit 216. The frame 202 also defines a plurality of radially inward-extending recesses 220 at the external surface 210, which serve the same function as the recesses 166 of frame 158 of fish tape drum 30.

With reference to FIGS. 15-17 and 33, the frame 202 includes a separator rib 222 extending radially inward from an inner surface 226 of the frame 202. The separator rib 222 includes a rib channel 230 extending through the rib 222 and leading to the nozzle channel 214, thus providing a passage for the fish tape 196 to exit and enter the drum portion 186. In some embodiments, the fish tape 196 is not provided in a single layer design. In other words, the fish tape 196 is not stacked one revolution on top of the next in a single column stack, such that multiple revolutions of the fish tape 196 are arranged approximately on the same plane as one another between the first and second clamshells 190, 194. Instead, the fish tape is freely located throughout the space in between the first and second clamshells 190, 194. In order to prevent the fish tape 196 from tangling and binding as the fish tape 196 is being dispensed from or retracted into the drum portion 186, the fish tape 196 in the drum portion 186 is prevented by the separating rib 222 from applying pressure against the portion of the fish tape 196 that is exiting or entering the rib channel 230, nozzle channel 214, and exit 216.

Figure 16:
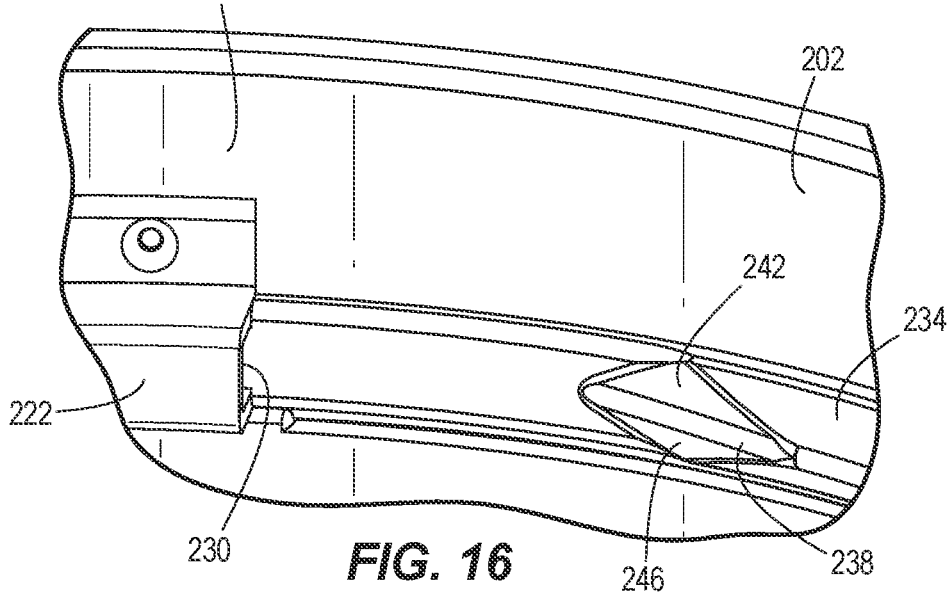
FIG. 16 is an enlarged perspective view of the fish tape drum of FIG. 14.

With continued reference to FIGS. 15-17 and 33, the frame 202 includes a diverter rib 234 extending approximately 290° around the circumference of the inner surface 226 of the frame 202. As shown in FIGS. 15 and 16, the diverter rib 234 includes a nose 238 having a first angled face 242 that is not parallel to the first clamshell 190 and a second angled face 246 that is not parallel to the second clamshell 194. As shown in FIG. 16, the nose 238 is arranged proximate to and on the same circumferential plane as the rib channel 230. As the fish tape 196 is retracted into the fish tape drum 182, instead of becoming frictionally locked on the diverter rib 234, the fish tape 196 is deflected away from the diverter rib 234 by one of the first or second angled faces 242, 246, such that the fish tape 196 is moved towards and into contact with one of the first or second clamshells 190, 194, which are rotating with respect to the frame 202 during the retraction operation.

In the embodiment of FIGS. 14, 15 and 17 and 19, the first clamshell 190 includes first slots 250 and the second clamshell 194 includes second slots 254 that are arranged in locations that correspond to the first slots 250, such that the first and second slots 250, 254 are aligned. The first and second slots 250, 254 extend between an inner wall 258 defining an inner diameter and an outer wall 262 defining an outer diameter of the first and second clamshells 190, 194, and thus the drum portion 186. An anchor member, such as pin 266, is arranged within a first slot 250 and a corresponding second slot 254. The pin 266 is moveable along the slots 250, 254, between a first position, in which the pin 266 is proximate the inner wall 258, and a second position, in which the pin 266 is proximate the outer wall 262. In other embodiments, such as the embodiment of FIGS. 31-33, the first clamshell 190 includes just one first slot 250 and the second clamshell 194 includes just one second slot 254.

The fish tape 196 includes an anchor end that is opposite of the moving end 218 and secured to the pin 266. In a retracting operation, when an operator is retracting the fish tape 196 into the drum portion 186, the pin 266 will automatically move towards the first position in response to the retracting rotation of the drum portion 186 until the pin 266 arrives at the first position. As the drum portion 186 continues its retracting rotation, the pin 266 will remain in the first position until the retracting operation is completed or the operator stops the retracting operation. Then, if an operator switches to a dispensing operation, as the fish tape 196 is dispensed from the drum portion 186, the pin 266 will move from the first position towards the second position in response to the dispensing rotation of the drum portion 186 until the pin 266 arrives at the second position. As the drum portion 186 continues its dispensing rotation, the pin 266 will remain in the second position until the dispensing operation is completed or the operator stops the dispensing operation.

Figure 18:
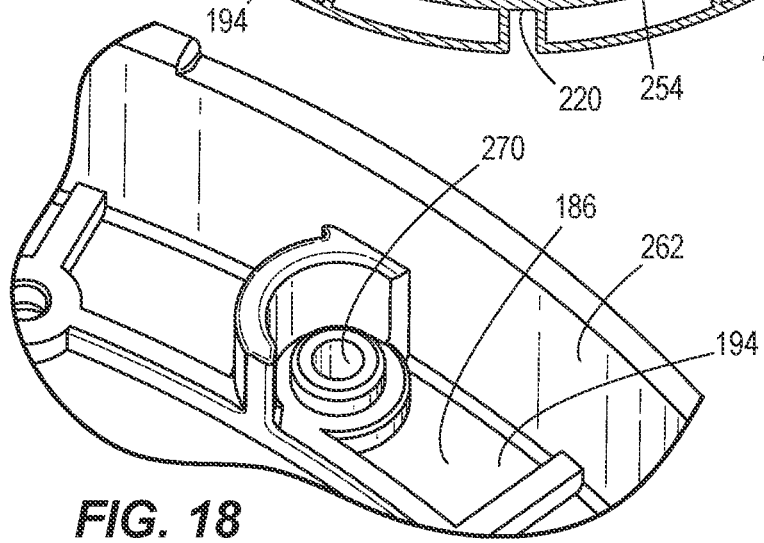
FIG. 18 is an enlarged perspective view of a fish tape drum according to another embodiment.
Figure 19:
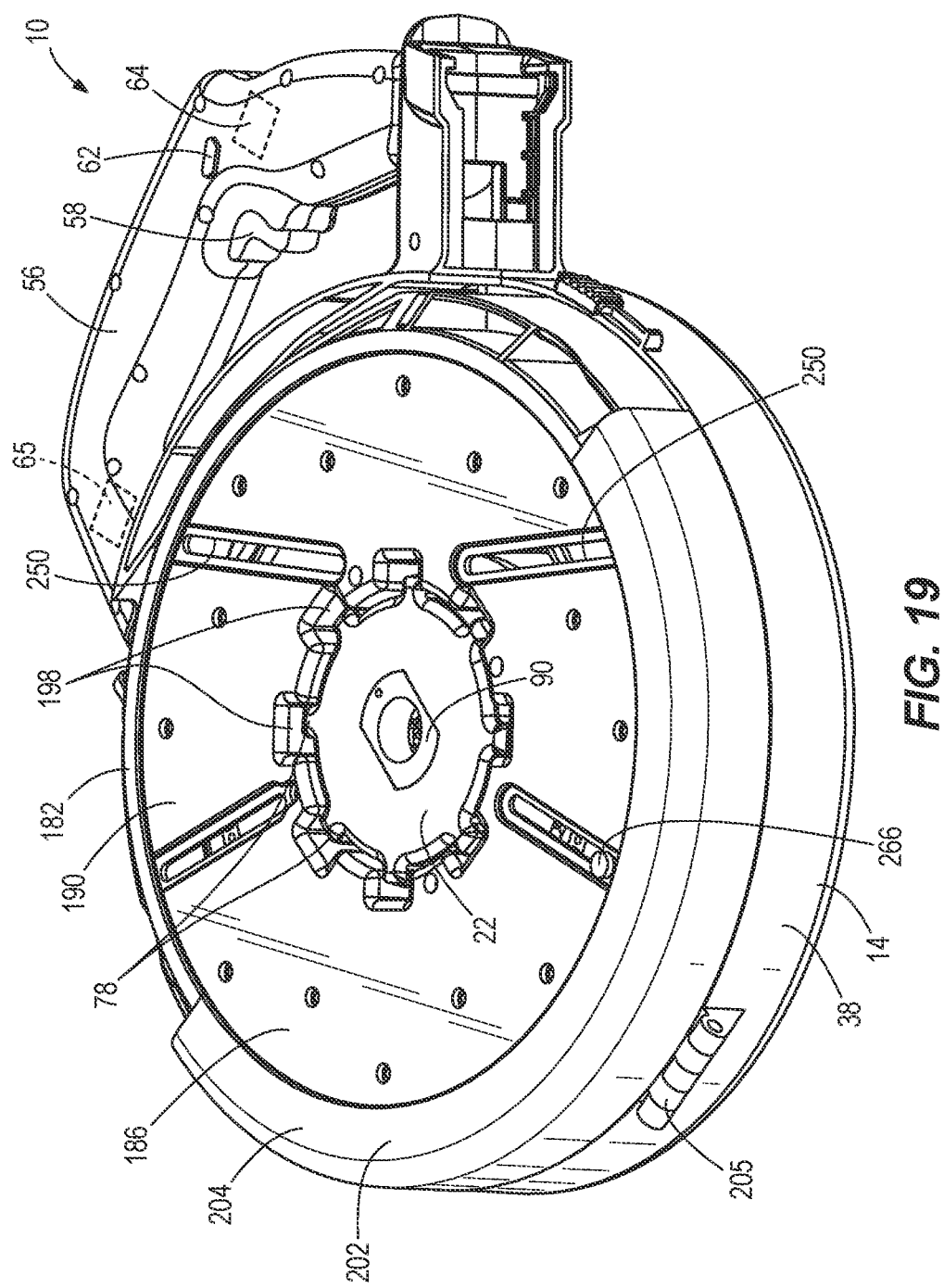
FIG. 19 is a perspective view of the fish tape drum of FIG. 14 received in a fish tape tool.

In another embodiment of fish tape drum 182 shown in FIG. 18, the anchor end of the fish tape 196 is secured at a fastening point 270 proximate the outer wall 262 of the drum portion 186. Thus, in the embodiment of FIG. 18, when the fish tape drum 182 includes a non-single layer tape, locating the fastening point 270 proximate the outer wall 262 of the drum portion eliminates "back-wind" and prevents the fish tape 196 from fouling when the fish tape 196 is dispensed under load.

Figure 20:
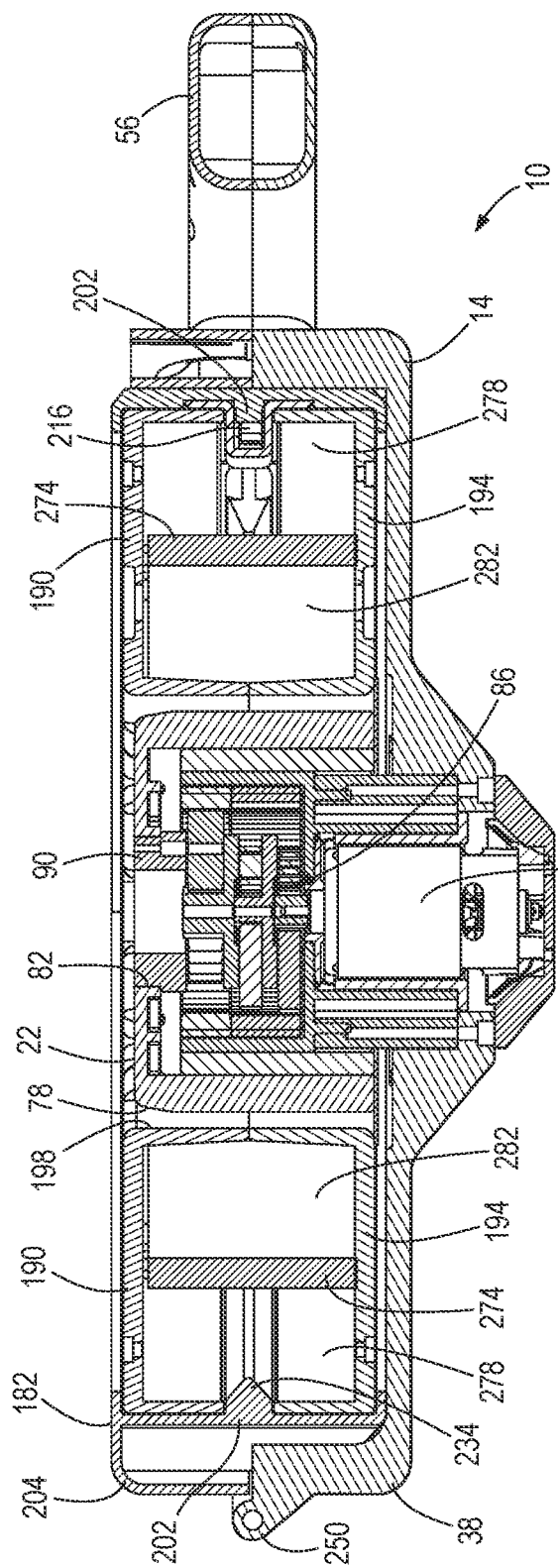
FIG. 20 is a cross-sectional view of a fish tape drum according to another embodiment.

In a different embodiment of the fish tape drum 182 shown in FIG. 20, the drum portion 186 includes an inner annular wall 274 to separate the drum portion 186 into an outer annular chamber 278 and an inner annular chamber 282. The inner annular wall 274 can be used to limit space inside the drum portion 186 for different types of fish tape. For instance, steel fish tape takes up less volume than the non-conductive fish tape. Thus, an operator can load the steel tape into the outer annular chamber 278, allowing the steel tape to fit more snugly within the drum portion 186 than in embodiments where the inner annular wall 274 is omitted. In this manner, the time it takes to dispense the steel tape can be reduced after the operator has pulled the trigger 58 for a dispensing operation.

Figure 21:
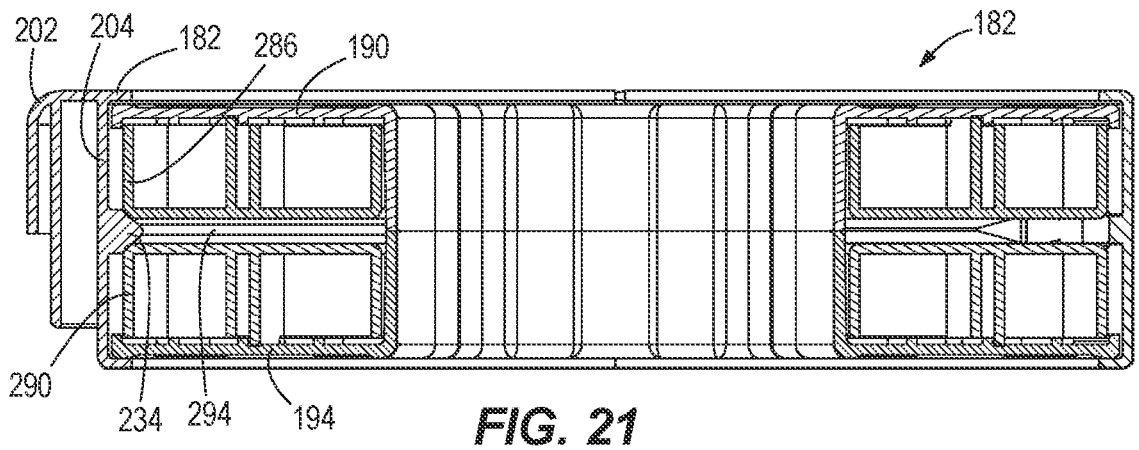
FIG. 21 is a cross-sectional view of the fish tape drum of FIG. 14 with a first insert and a second insert inserted into a drum portion.

In some embodiments, a first insert 286 and a second insert 290 are removably arranged between the first and second clamshells 190, 194 of the drum portion 186, such that a channel 294 is defined between the first and second inserts 286, 290, as shown in FIG. 21. In some embodiments, the first insert is removably coupled to the first clamshell 190 and the second insert 290 is removably coupled to the second clamshell 194, such that the first and second inserts 286, 290 are respectively coupled for rotation with the first and second clamshells 190, 194, which are coupled for co-rotation themselves. By arranging the first and second inserts 286, 290 within the drum portion 186, the axial spacing between the first and second clamshells 190, 194 is limited to the channel 294. Thus, when using single layer fish tape (omitted from FIG. 21 for clarity), the fish tape is limited to align itself, revolution upon revolution, within the channel 294. By forcing the single layer fish tape to be a single stacked column of tape within the channel 294, friction between the revolutions of fish tape is reduced.

Figure 22:
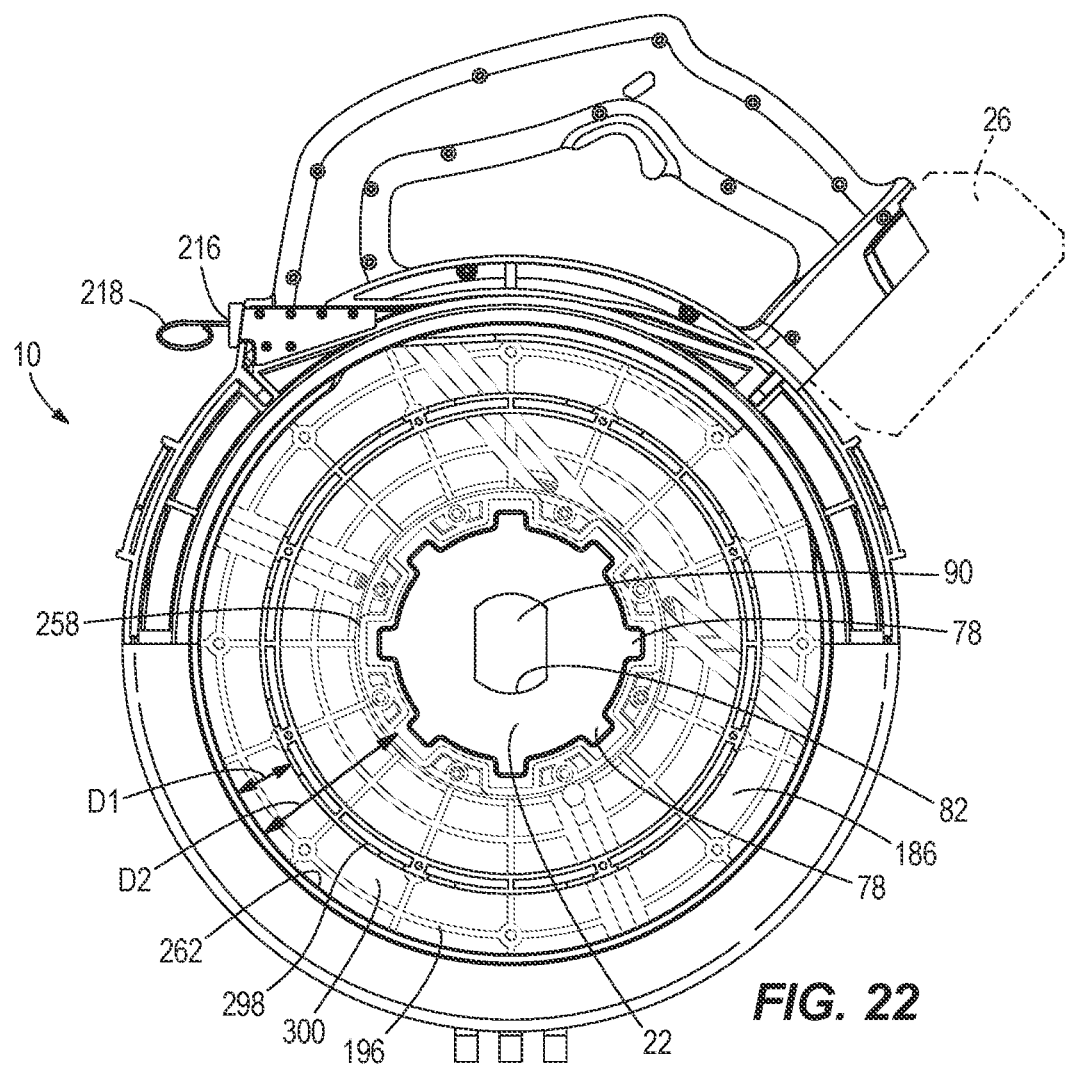
FIG. 22 is a perspective view of the fish tape drum of FIG. 14 with a third insert inserted into a drum portion.

In some embodiments, a third insert 298 is removably arranged in the drum portion 186 between the inner and outer walls 258, 262 of the drum portion 186, as shown in FIG. 22. The first clamshell 190 is clear plastic in FIG. 22 to illustrate the position of the third insert 298 relative to the inner and outer walls 258, 262. The fish tape 196 is arranged in a circumferential channel 300 between the third insert 298 and the outer wall 258. A first radial distance D1 is defined between the inner and outer walls 258, 262 of the drum portion 186 and a second radial distance D2 is defined between the third insert 298 and the outer wall 262. The second radial distance D2 is less than the first radial distance D1, such that the third insert 298 functions to limit the radial space in which the fish tape 196 is arranged in the drum portion 186, i.e. the channel 300, making the third insert 298 an effective addition for shorter-length fish tape 196. Specifically, by inserting the third insert 298 into the drum portion 186, the lag time between initiating a feeding operation with trigger 58 and the point at which the moving end 218 of the fish tape 196 begins dispensing is reduced for shorter-length fish tape 196.

Figure 23:
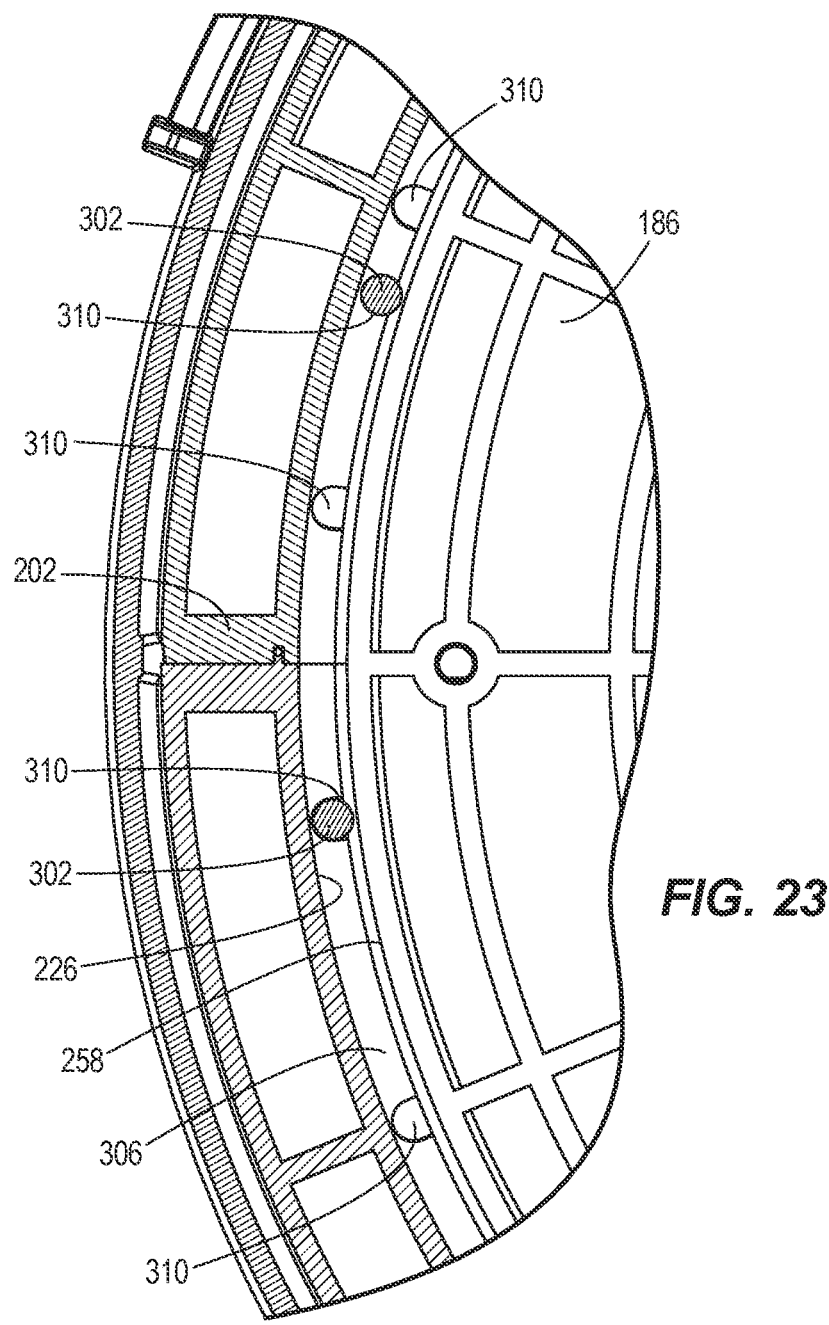
FIG. 23 is a cross-sectional view of a fish tape drum according to another embodiment.

In some embodiments, instead of a diverter rib 234, the frame 202 includes bearings 302 on an inner edge 306 adjacent the inner surface 226, as shown in FIG. 23. Specifically, the bearings 302 are arranged in bores 310 in the inner edge 310 and are configured to rotate with respect to the inner edge 310. In some embodiments, the bearings 302 are needle bearings. The outer wall 262 of the drum portion 186 is configured to move along the bearings 302 as the drum portion 186 rotates relative to the frame 202, thus reducing friction between the outer wall 262 and the frame 202.

Figure 24:
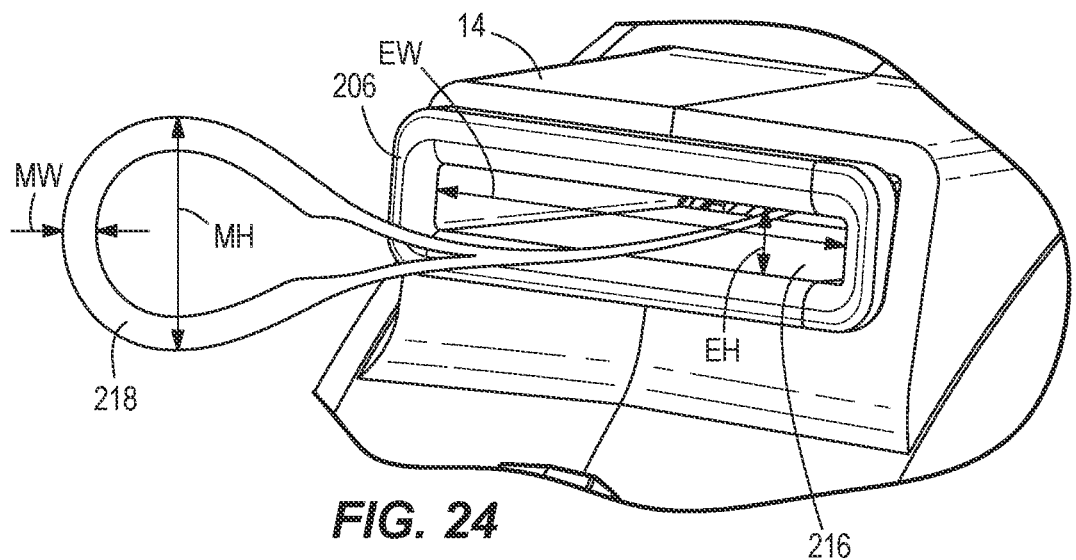
FIG. 24 is a perspective view of nozzle of a fish tape drum according to another embodiment.

In some embodiments, the exit 216 for the fish tape 196 is modified such that the exit width EW is wider than the moving end width MW, while the exit height EH still remains less than the moving height MH of the moving end 218 of the fish tape, as shown in FIG. 24. The exit width EW is much greater than the exit height EH, such that the fish tape 196 is not restricted as it is dispensed or retracted into the exit 216. In some embodiments, the length of the exit width EW is more than four times the length than the exit height EH. Also, because the exit height EH is less than the moving height MH of the moving end 218, the moving end 218 is prevented from being retracted into the exit 216.

Figure 25:
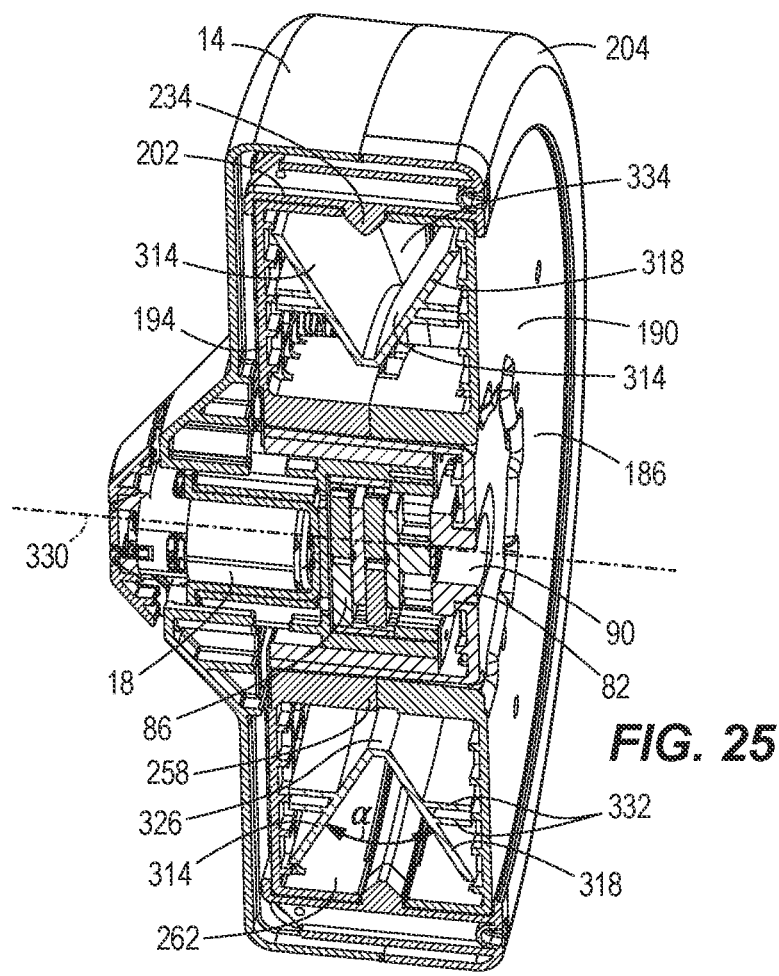
FIG. 25 is a cross-sectional view of the fish tape drum of FIG. 14 with a fourth insert inserted into a drum portion.

In some embodiments, a fourth insert 314 is removably arranged in the drum portion 186, as shown in FIG. 25. The fourth insert 314 has a first wall 318 and a second wall 322 forming a cross-sectional V-shape. An acute angle α is defined between the first and second walls 318, 322. The fourth insert 314 also includes a joining portion 326 that joins the first and second walls 318, 322. The joining portion 326 is approximately parallel to an axis of rotation 330 about which the drum portion 186 rotates. In the illustrated embodiment, the joining portion 326 is spaced from the inner wall 258 of the drum portion 186. In the illustrated embodiment, a plurality of ribs 332 enable the fourth insert 315 to be removably coupled to the first and second clamshells 190, 194 of the drum portion 186. A channel 334 is defined between the first and second walls 318, 322 and in operation, the fish tape 196 is arranged in the channel 334 (but is omitted from FIG. 25 for clarity).

As shown in FIG. 25, a distance between the first and second walls 318, 322 increases when moving in a direction from the rotational axis 330 toward the outer wall 262 of the drum portion 186. In other words, the channel 334 gets progressively wider when moving in a direction from the rotational axis 330 toward the outer wall 262 of the drum portion 186. The fourth insert 314 thus provides a wider space for the fish tape 196 near the outer wall 262, proximate the channel 230 leading to the exit 216, and a narrower space for the fish tape 196 near joining portion 326. The progressively widening channel 334 helps the fish tape 196 to layer more evenly in the drum portion 186 and prevents the fish tape 196 from tangling during a feeding operation. The progressively widening channel 334 also helps prevent steel fish tape from binding.

Figure 26:
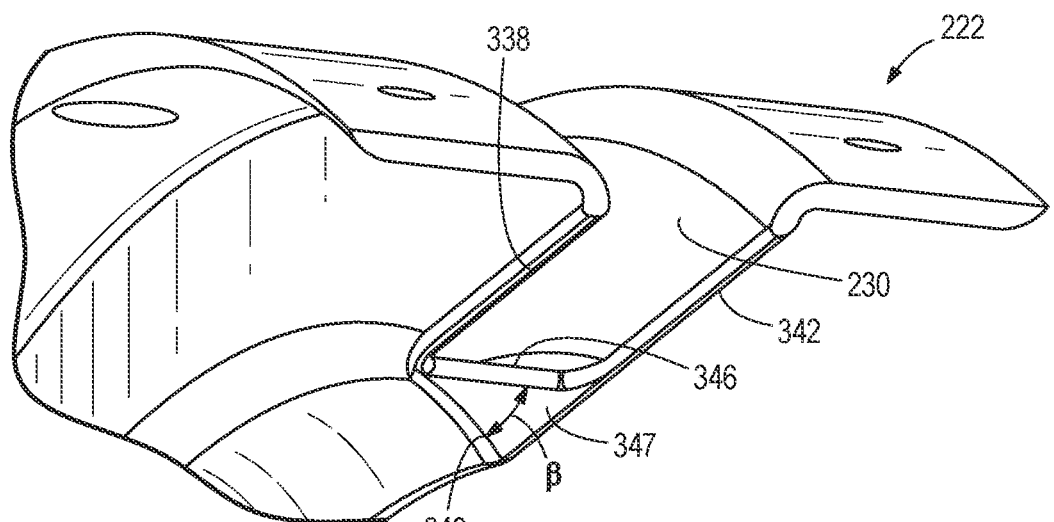
FIG. 26 is an enlarged perspective view of a separator rib of a fish tape drum according to another embodiment.
Figure 27:
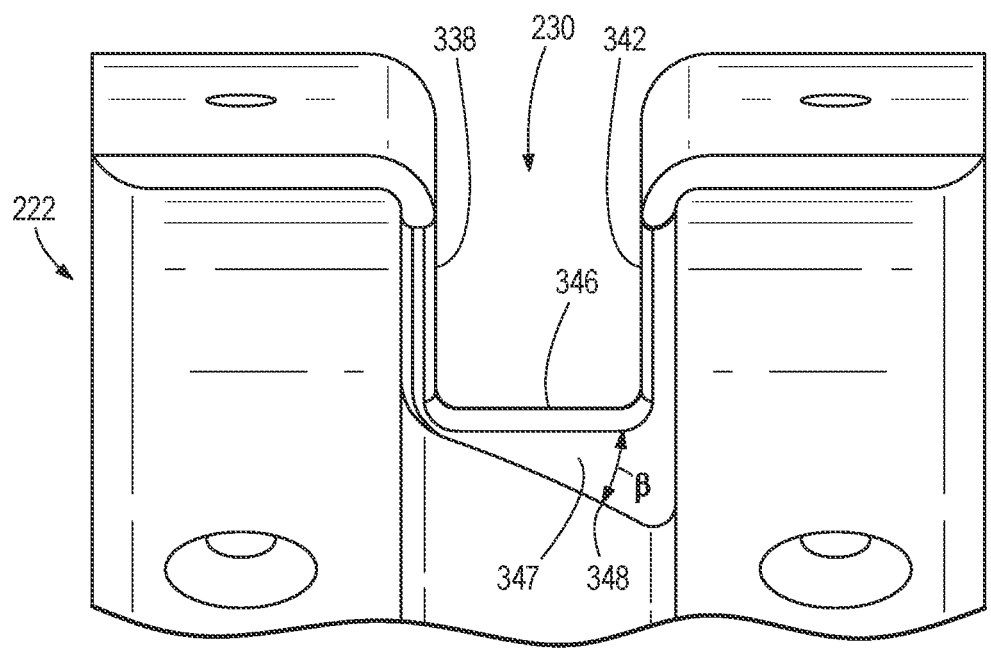
FIG. 27 is a plan view of the separator rib of FIG. 26.

In some embodiments of the separator rib 222, the rib channel 230 arranged in the separator rib 222 is defined by two side walls 338, 342 and a bottom wall 346 of the separator rib 222, as shown in FIGS. 26, 27 and 33. The separator rib 222 further includes an angled protrusion 347 extending inwardly from the bottom wall 346 and having an angled edge 348 that forms an acute angle β with respect to the bottom wall 346. Thus, as the fish tape 196 stacks on itself during a retracting operation, the angled protrusion 347 tends to push the layers of fish tape 196 off to either side of the separator rib 222, in order to inhibit the fish tape 196 from forming in a single column layered on itself.

Figure 28:
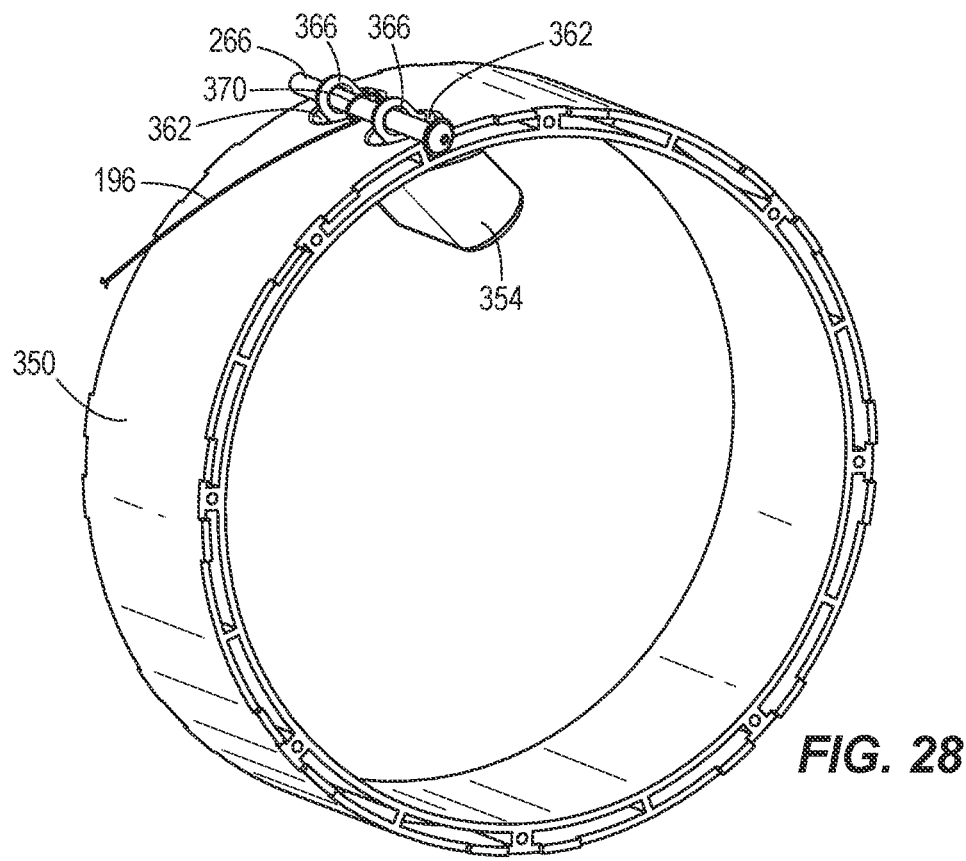
FIG. 28 is a perspective view of an intermediate wall of a drum portion of the fish tape drum of FIG. 14, according to another embodiment.
Figure 29:
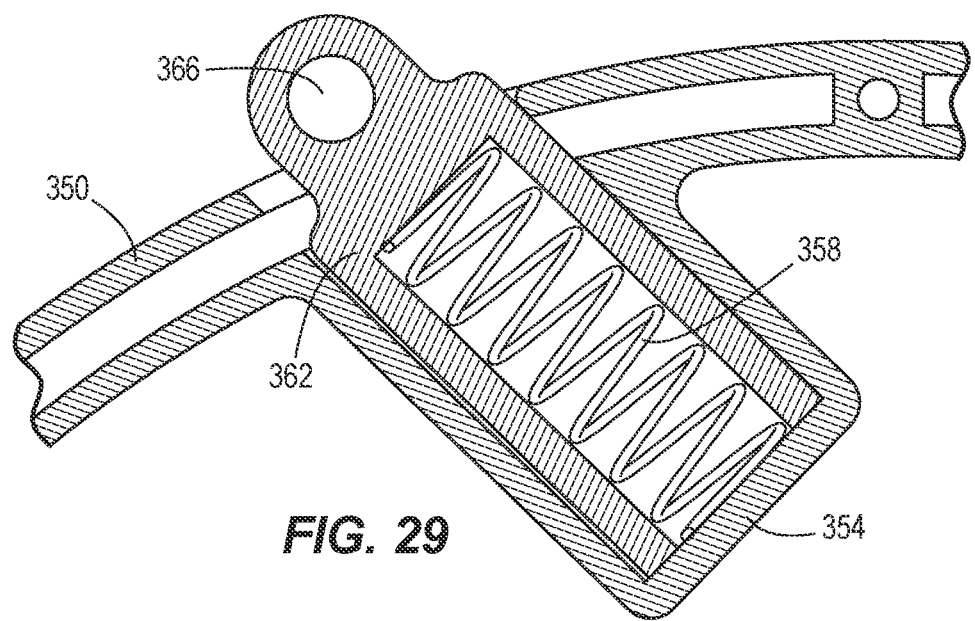
FIG. 29 is a cross-sectional view of the intermediate wall of FIG. 28.

In the embodiments of FIGS. 28 and 29 and 31-33 the drum portion 186 includes an intermediate wall 350 coupled between the first and second clamshells 190, 194 and radially arranged between the inner and outer walls 258, 262 of the drum portion 186. Only the intermediate wall 350 is shown in FIGS. 28 and 29, for clarity. However, the intermediate wall 350 is shown in the drum portion 186 in FIG. 33. The fish tape 196 is arranged between the intermediate wall 350 and the outer wall 262 within the drum portion 186.

The intermediate wall 350 includes a well 354 that functions as a spring seat for a pair of biasing members, such as springs 358. The springs 358 respectively bias a pair of holding members 362 outwardly from the intermediate wall 350. The holding members 362 each include an aperture 366 in which the movable anchor, such as the pin 266, is retained. Thus, the pin 266, arranged in the slots 250, 254 (FIGS. 14 and 15), is biased by the springs 358 toward the second position of the pin 266, in which the pin 266 is proximate the outer wall 262, such that during a retracting or dispensing operation, an anchor end 370 of the fish tape 196 is biased toward the outer wall 262 of the drum portion 186 to eliminate tangling of the fish tape 196 until the spring force is overcome. In the embodiments of FIGS. 28, 29 and 31-31, the first position of the pin 266 is proximate the intermediate wall 350 rather than the inner wall 258. Thus, the intermediate wall 350 functions as an "inner wall" for the embodiments of FIGS. 28 and 29 and 31-33, because the fish tape 192 is arranged between intermediate wall 350 and the outer wall 262, and because the pin 266 only moves between the intermediate wall 350 and the outer wall 262.

Figure 30:
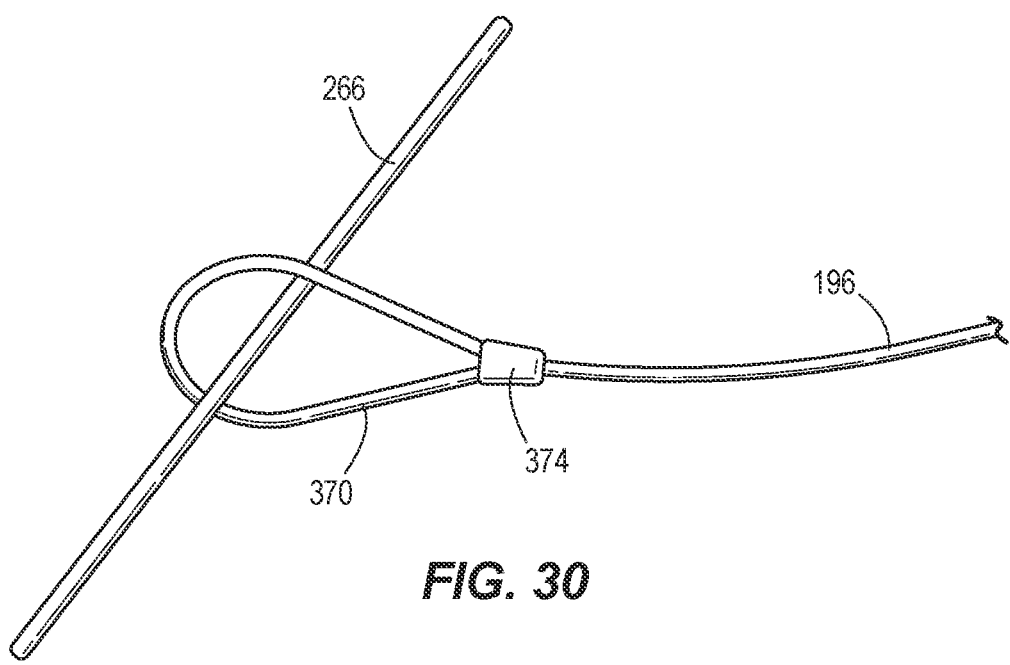
FIG. 30 is a perspective view of an anchor end of a fish tape coupled to an anchor, according to another embodiment.

In the embodiment of FIG. 30, the anchor end 370 of the fish tape 196 is looped over the pin 266 and welded to itself at a weld point 374, which provides a high strength connection of the fish tape 196 to the pin 266.

Figure 34:
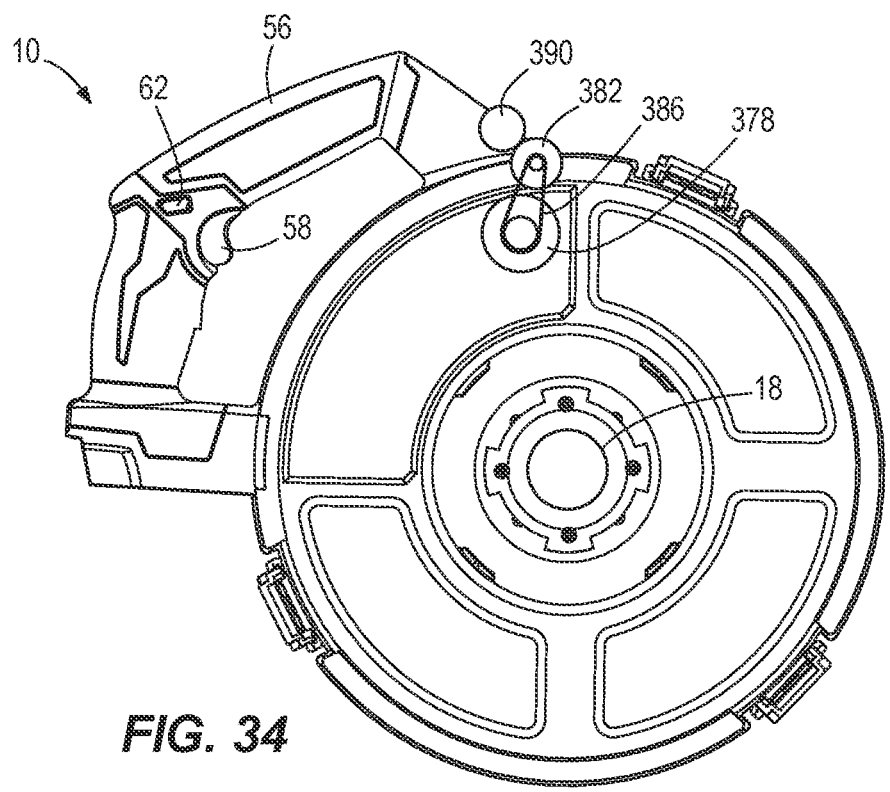
FIG. 34 is a schematic view of another embodiment of a fish tape tool.

FIG. 34 illustrates a fish tape tool 10 that is similar to the fish tape tool of FIGS. 31-33, except for the following differences explained below. Specifically, the fish tape tool includes a second motor 378 that is coupled to a drive roller 382 via a belt 386 or second transmission. The drive roller 382 and an adjacent idler roller 390 are arranged proximate the nozzle 206 or rib channel 230 (not shown in FIG. 34 but see FIG. 33). In the embodiment of FIG. 34, the first motor 18 is used only to retract the fish tape 196. The second motor 378 is included only for dispensing the fish tape 196, which is wedged between the drive roller 382 and idler roller 390 by a clamping force. Thus, in a dispensing operation, the second motor 378 rotates the drive roller 382 and because the fish tape 196 is clamped between the drive and idler rollers 382, 390, rotation of the drive roller 382 forces the fish tape 196 out of the nozzle 206. In the embodiment of FIG. 34, the first transmission 86 has a clutch to clutch out the first motor 18 during a dispensing operation and the second motor 378 also has a clutch mechanism, such as in the second transmission, to clutch out the second motor 378 during a retracting operation. Thus, during the dispensing operation, even though dispensing of the fish tape 196 causes the drum portion 186 to rotate relative to the frame 202, thus causing the output reel 22 to rotate, rotation of the output reel 22 is not translated back through to the first motor 18 because of the clutch in the transmission 86. During a retracting operation, even though retraction of the fish tape 196 causes the drum portion 186 to rotate relative to the frame 202, thus causing the drive roller 382 to rotate as the fish tape 196 moves between the driver roller 382 and the idler roller 390, rotation of the drive roller 382 is not translated to the second motor 378 because of the clutch mechanism, e.g., in the second transmission.

Figure 35:
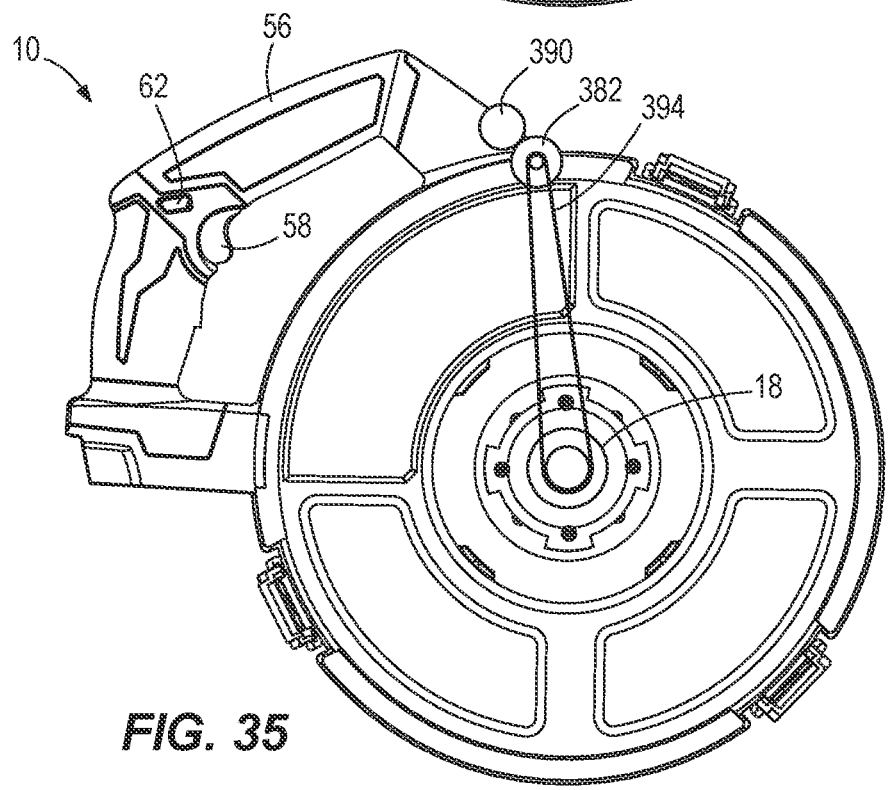
FIG. 35 is a schematic view of another embodiment of a fish tape tool.

FIG. 35 illustrates a fish tape tool 10 that is similar to the fish tape tool of FIG. 34, except for the following differences explained below. Specifically, the fish tape tool 10 includes the drive roller 382 and idler roller 390 of the embodiment of FIG. 34, but omits the second motor 378 and the belt 386 or second transmission. Instead, a belt 394 or second transmission transmits torque between the motor 18 and the drive roller 382. In the embodiment of FIG. 35, the drive and idler rollers 382, 390 include one way needle bearings. Thus, during the dispensing operation, the drive roller 382 receives torque from the motor 18 via the belt 394 or second transmission and the fish tape 196 is forced out of the nozzle 206 in a similar manner as in the embodiment of FIG. 34. During a retracting operation, as the fish tape 196 is retracted between the drive and idler rollers 382, 390, the drive and idler rollers 382, 390 spin freely via the one way needle bearings, such that rotation of the drive roller 382 does not transmit torque back to the motor 18 via the belt 394 or second transmission.

Figure 36:
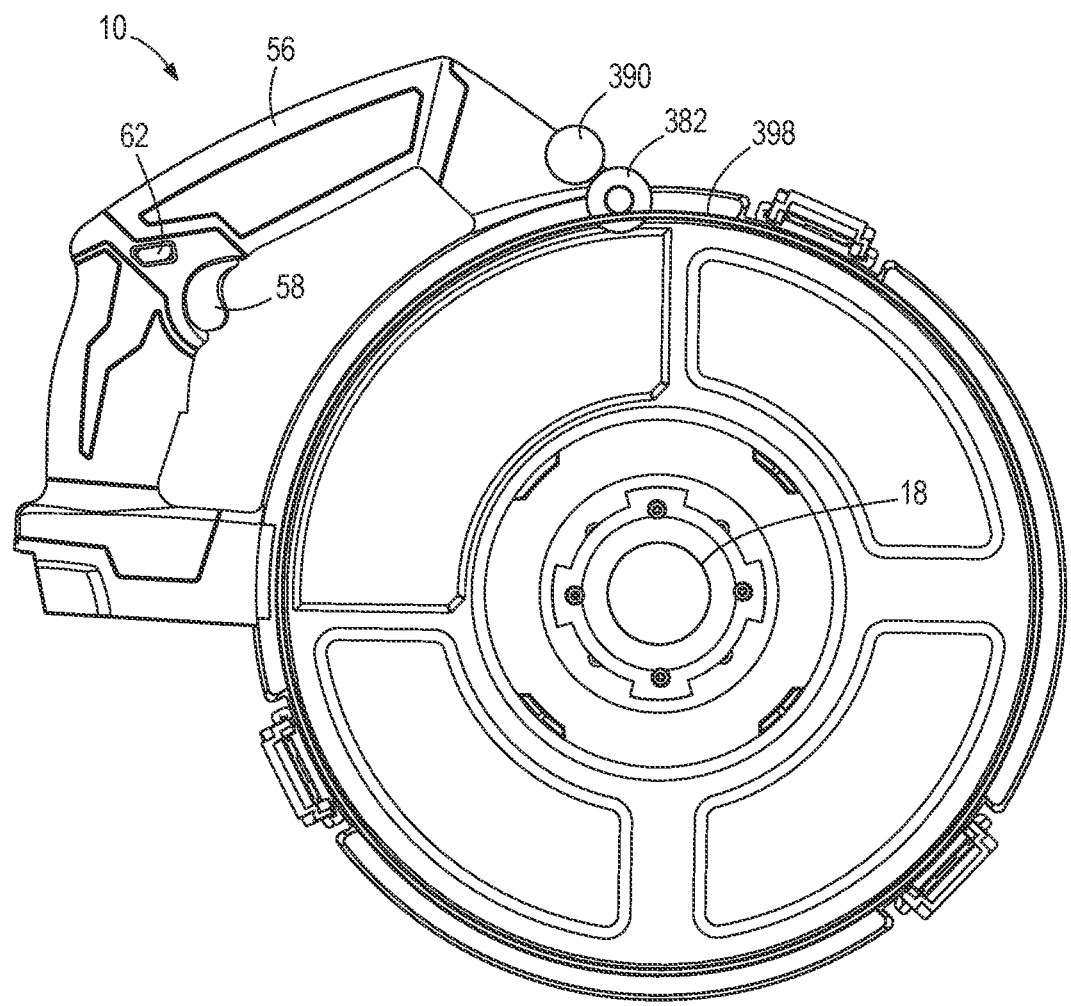
FIG. 36 is a schematic view of another embodiment of a fish tape tool.

FIG. 36 illustrates a fish tape tool 10 that is similar to the fish tape tool of FIG. 35, except for the following differences explained below. Specifically, the fish tape tool 10 includes the drive roller 382 and idler roller 390 of the embodiment of FIG. 34, but omits the belt 394 or second transmission between the motor 18 and the drive roller 382. Instead, the outer wall 262 of the drum portion 186 of the fish tape drum 182 includes a ring gear 398 that meshes with the drive roller 382. Thus, during the dispensing operation, the drum portion 186 is rotated by the output reel 22, causing the ring gear 398 to rotate the drive roller 382, such that the fish tape 196 is forced out of the nozzle 206 in a similar manner as in the embodiment of FIG. 35. During a retracting operation, as the fish tape 196 is retracted between the drive and idler rollers 382, 390, the drive and idler rollers 382, 390 spin freely via the one way needle bearings, such that rotation of the drive roller 382 does not transmit torque back to the motor 18 via the ring gear 398.

Figure 37:
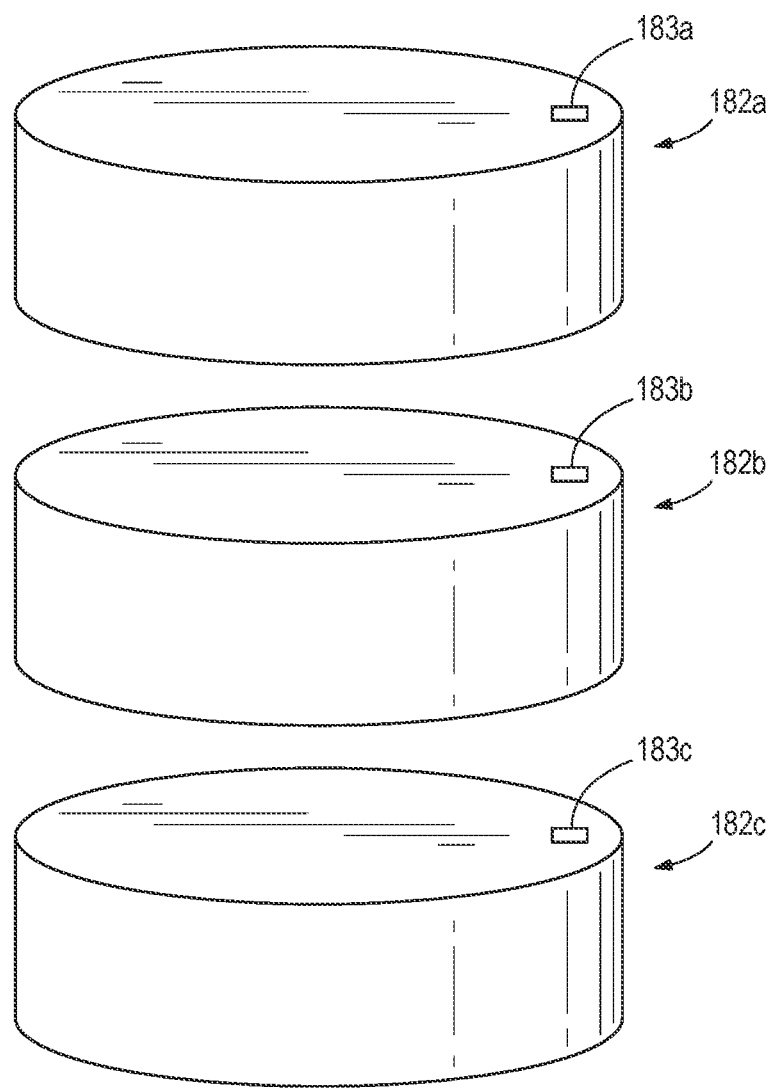
FIG. 37 is a perspective view of a plurality of fish tape drums for use with the fish tape assembly of FIG. 31.

As discussed above and shown in FIG. 37, in some embodiments, there are a plurality of different fish tape drums 182a, 182b, 182c, each containing a different type of fish tape 196, such as steel, conductive, non-conductive, etc. Depending on which fish tape drum 182a, 182b, 182c is inserted into the fish tape tool 10, the motor 18 may need to generate a different level of torque to rotate output reel 22 to rotate the drum portion 186 of the fish tape drum 182, because some fish tapes 196 are relatively weaker or stronger than others. Thus, in some embodiments, the fish tape tool 10 includes a sensor 402 (FIG. 32) to detect what type of fish tape 196 is in the fish tape drum 182 inserted into the chamber 50 of the housing 14. The sensor 402 is in electrical communication with the controller 65, which is in communication with the motor 18.

In some embodiments, each of the fish tape drums 182a, 182b, 182c includes a detectable element 183a, 183b, 183c, such as a magnet, RFID tag, or barcode, that is indicative of the type of fish tape 196 in the respective fish tape drum 182a, 182b, 182c. The detectable elements 183a, 183b, 183c are respectively detectable by the sensor 402 of the fish tape tool 10 when the respective fish tape drums 182a, 182b, 182 are received in the chamber 50. For example, the sensor 402 may be a hall-effect sensor, an RFID reader, or barcode reader. Thus, based on the sensor 402 detecting one of the detectable elements 182a, 182b, 182c, the controller 65 is able to determine what type of fish tape 196 is in the fish tape drum 182 loaded into the fish tape tool 10.

Based on the type of fish tape 196 determined by the controller 65, the controller can accordingly adjust the torque that is generated by the motor 18 to rotate output reel 22 without requiring the operator to make any proactive adjustment to the fish tape tool 10. For instance, when the controller 65 determines that a relatively weaker fish tape 196 is in fish tape drum 182, the controller 65 will cause the motor 18 to generate less torque than if the controller 65 has detected that a relatively stronger fish tape 196 is in the fish tape drum 182. Likewise, when the controller 65 determines that a relatively stronger fish tape 196 is in fish tape drum 182, the controller 65 will cause the motor 18 to generate more torque than if the controller 65 has detected that a relatively weaker fish tape 196 is in the fish tape drum 182. In this manner, the fish tape tool 10 avoids breaking a relatively weaker fish tape 196 by reducing the torque applied to the drum portion 186 of the fish tape drum 192 via the output reel 22. Also, the fish tape tool 10 can apply more torque to the drum portion 186 when the fish tape drum 182 contains a relatively stronger type of fish tape 196.

In other embodiments, the detectable element 183 is omitted from the fish tape drum 182, and the sensor 402 is a weight sensor configured to detect the weight of the fish tape drum 182 and fish tape 196 therein. Thus, based on the weight detected by the sensor 402, the controller 65 can determine what type of fish tape 196 is in the drum 182 and adjust the torque generated by the motor 18, as described above.

In other embodiments, the detectable element 182 is omitted and the sensor 402 is configured to sense the dielectric constant of the fish tape 196 within the fish tape drum 182. Thus, the sensor 402 can detect whether the fish tape 196 in the fish tape drum 182 is conductive or non-conductive when the fish tape drum 182 is received in the chamber 50. Based on whether the sensor 402 has detected conductive or non-conductive fish tape 196, the controller 65 can determine what type of fish tape is in the drum 182 and adjust the torque generated by the motor 18, as described above.

Figure 38:
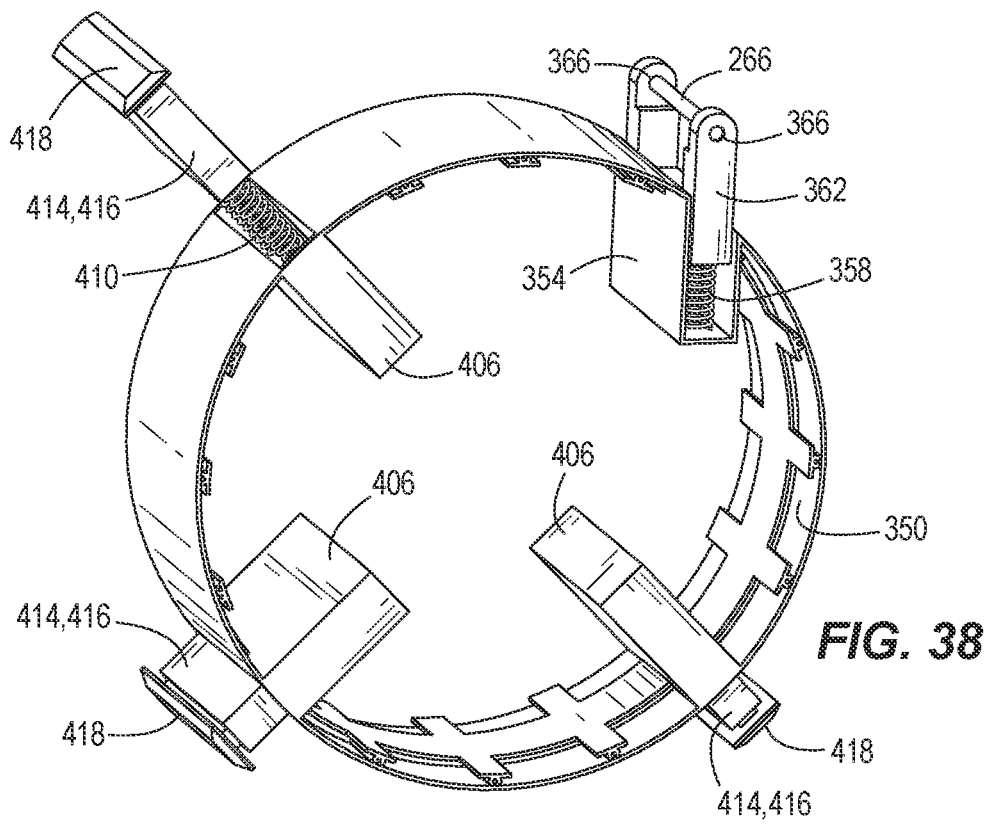
FIG. 38 is a perspective, partially exploded, view of an intermediate wall of a drum portion of the fish tape drum of FIG. 28, according to another embodiment.
Figure 39:
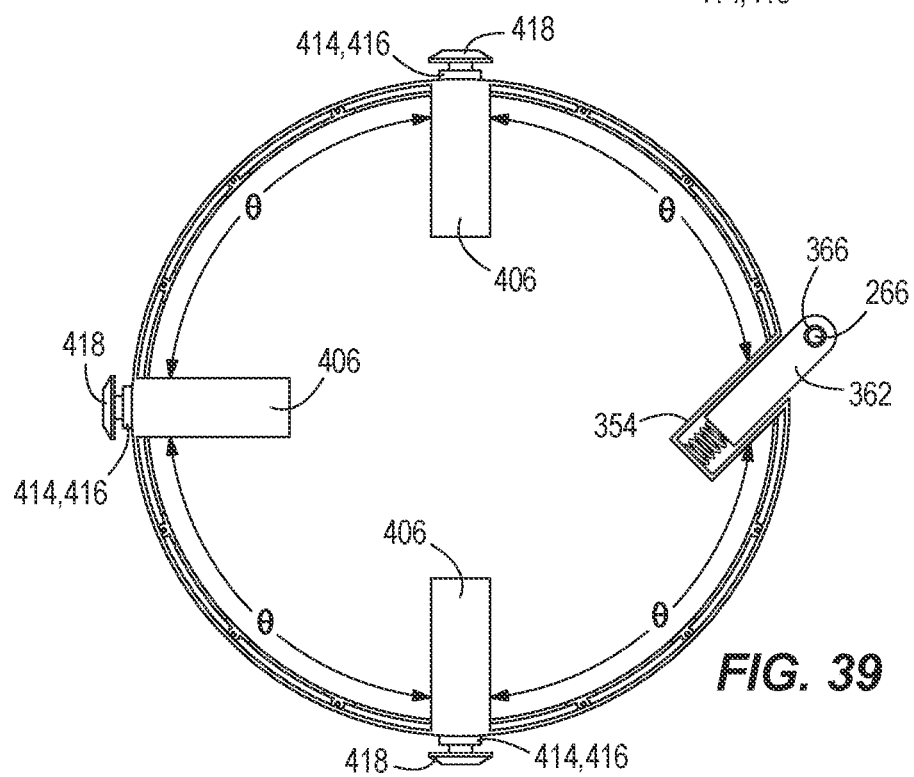
FIG. 39 is a schematic plan view of the intermediate wall of FIG. 38.

FIGS. 38 and 39 illustrate an embodiment similar to the embodiment of FIGS. 28 and 29 and 31-33, with the following differences explained below. In addition to the well 354 which holds the holding member 362, the intermediate wall 350 also includes a plurality of secondary wells 406. Like the well 354 which has one or more springs 358, the secondary wells 406 each include one or more pusher springs 410. However, unlike the well 354 and springs 358, the one or more pusher springs 410 of the secondary wells 406 each bias a respective pushing member 414 radially outward from the intermediate wall 350 and toward the outer wall 262 of the drum portion 186 of the fish tape drum 182. Thus, like the embodiments of FIGS. 28 and 29 and 31-33, the intermediate wall 350 of the embodiment of FIG. 38 functions as an "inner wall", because the fish tape 192 is arranged between intermediate wall 350 and the outer wall 262, and because the pin 266 only moves between the intermediate wall 350 and the outer wall 262.

As shown schematically in FIG. 39, each pair of adjacent secondary wells 406 and pushing members 414 is equally spaced from one another. In other words, the same angle θ is defined between each pair of adjacent secondary wells 406 and pushing members 414. Also, the same angle θ is defined between the well 354 for the holding member 362 and anchor 266, and each of the secondary wells 406 and pushing members 414 adjacent the well 354, holding member 362 and pin 266. In the illustrated embodiment, there are three secondary wells 406 and pushing members 414, such that the angle θ is 90°. However, in other embodiments there can be more pushing members 414, such that the angle θ is smaller than 90°, and in other embodiments, there can be fewer pushing members 414, such that the angle is 0 greater than 90°.

The pushing members 414 each include a body 416 and head 418 oriented transverse to the body 416. At least a portion of the bodies 416 are arranged in the secondary wells 406 and the heads 418 are arranged outside the secondary wells 406. In operation of the embodiment of FIGS. 38 and 39, the pin 266 function exactly as in the embodiment of FIGS. 28, 29 and 31-33. However, unlike the embodiment of FIGS. 28, 29 and 31-33, the heads 418 of the pushing members 414 of the embodiment of FIGS. 38 and 39 engage and push an intermediate portion of the fish tape 196 that is in between the moving end 218 and the anchor end 370 radially outward to increase tension of the fish tape 196 and thereby inhibit the intermediate portion of fish tape 196 from becoming tangled in the free space in between the intermediate wall 350 and the outer wall 262.

Figure 40:
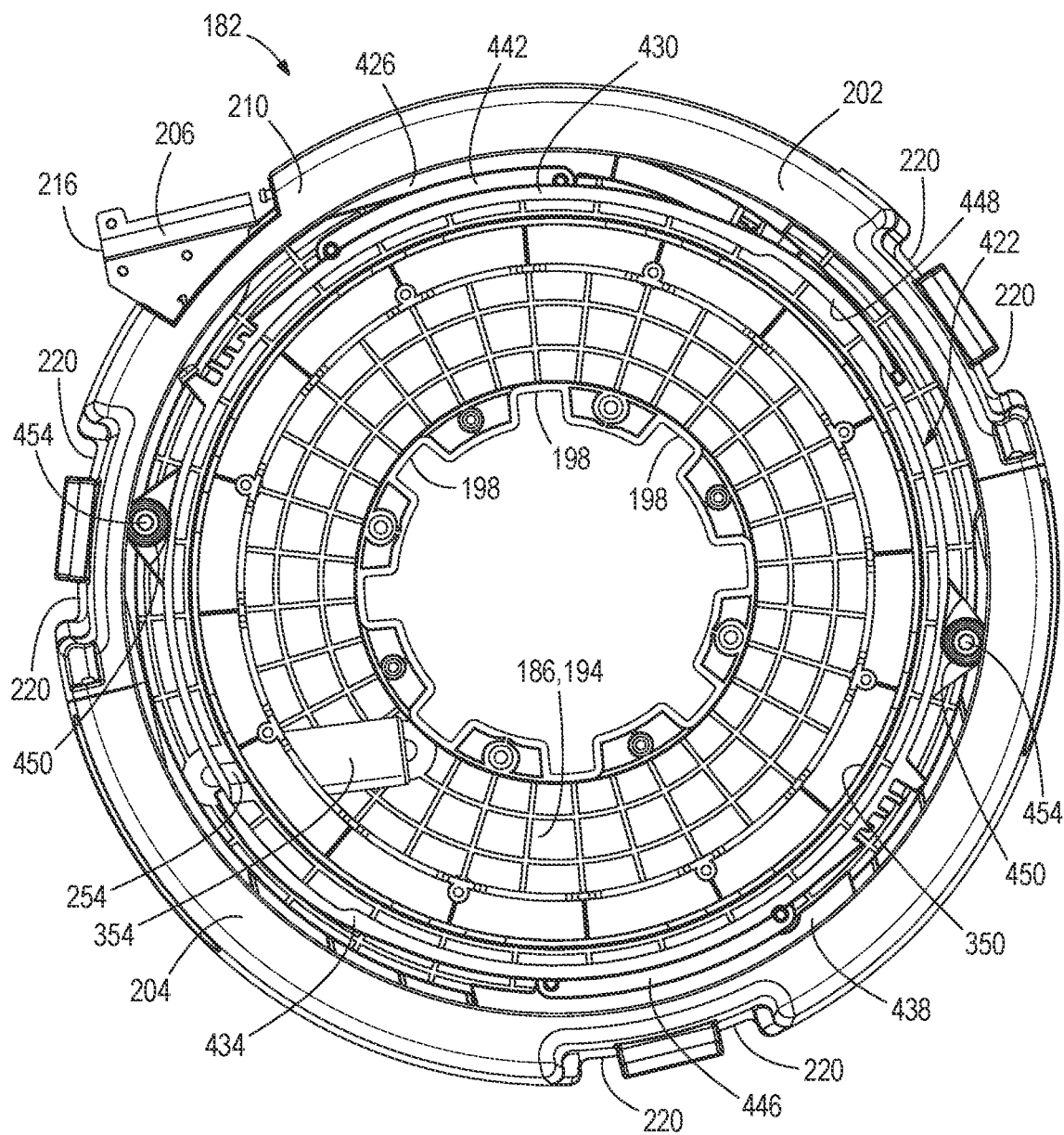
FIG. 40 is a plan view of a fish tape drum according to another embodiment of the invention, with portions removed.
Figure 41:
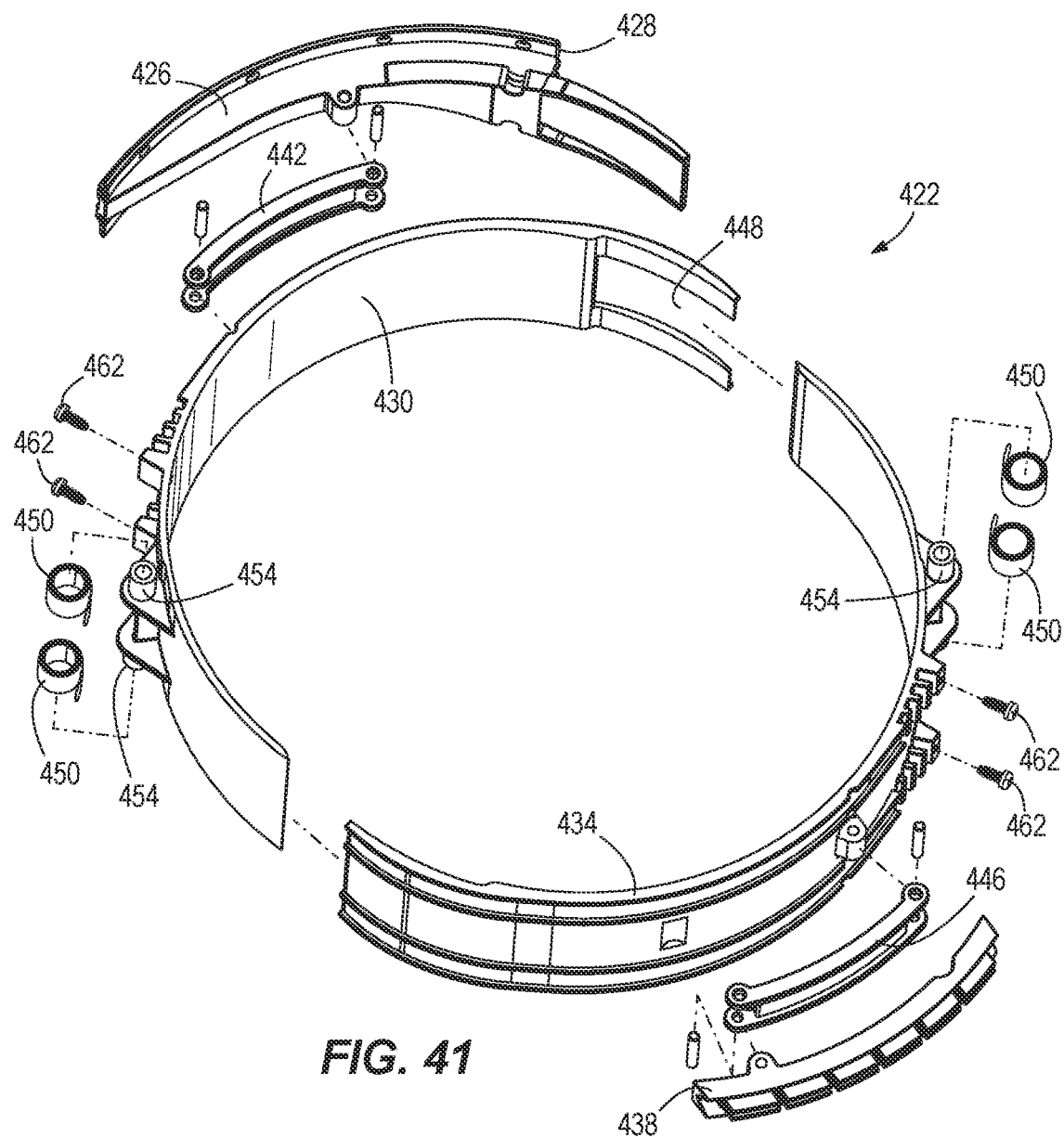
FIG. 41 is an exploded view of a constricting assembly of the fish tape drum of FIG. 40.
Figure 42:
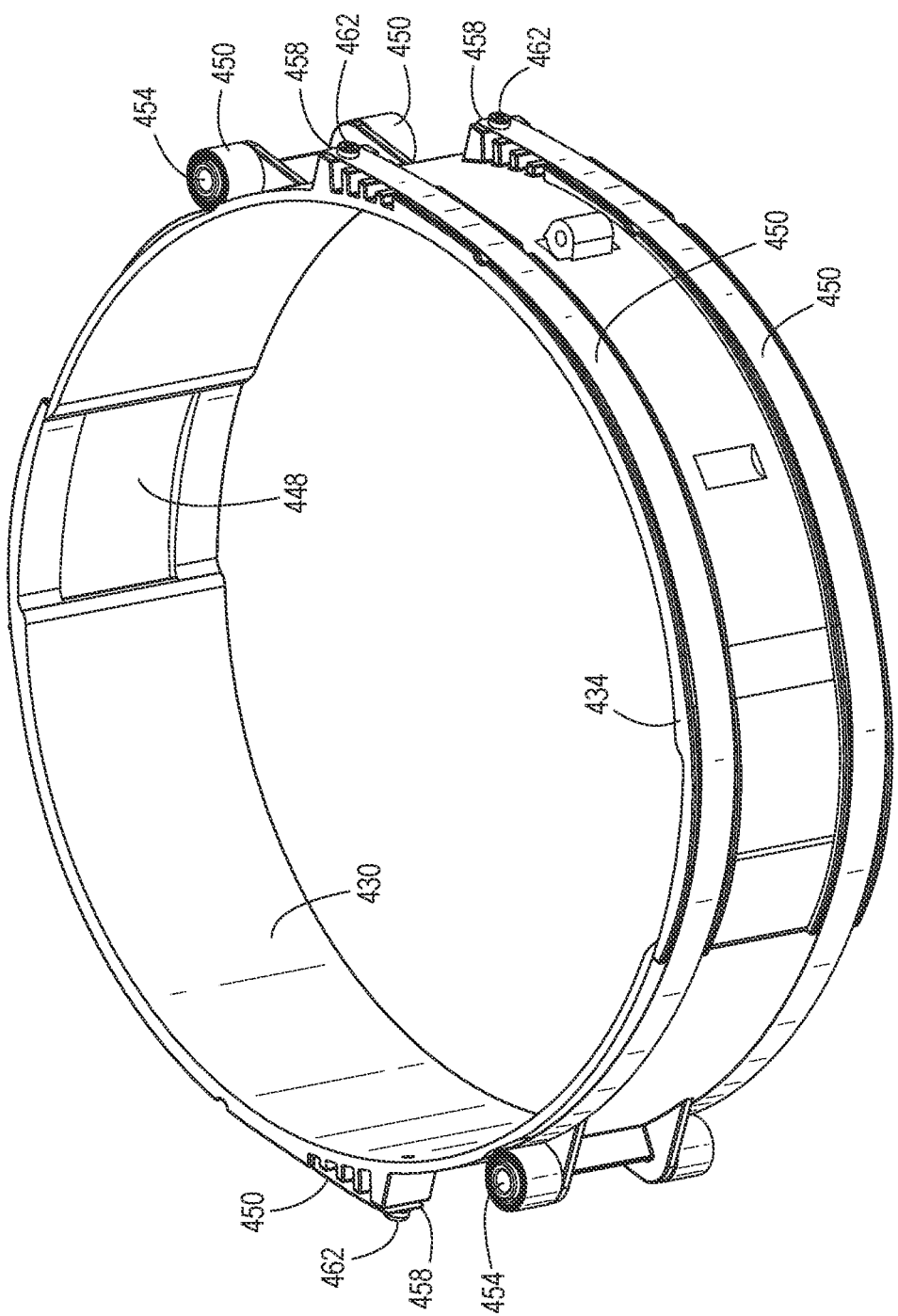
FIG. 42 is a perspective view of the constricting assembly of FIG. 41, with portions removed.

As shown in FIGS. 40-42, in some embodiments, the drum portion 186 of the fish tape drum 182 includes a flexible constricting assembly 422 radially arranged between the intermediate wall 350 and the outer wall 262 of the drum portion 186. In the embodiment of FIGS. 40-42, only the well 354 for holding members 362 (omitted from FIG. 40 for clarity) is shown on the intermediate wall 350, but in other embodiments, the intermediate wall 350 could be the intermediate wall 350 of FIGS. 38 and 39, thus including a plurality of secondary wells 406 and pushing members 414.

The flexible constricting assembly 422 includes a channel member 426 that is coupled to the frame 202. The channel member 426 has a channel 428 leading to the nozzle channel 214, thus providing a passage for the fish tape 196 to exit and enter the drum portion 186, similar to the rib channel 230 of FIG. 17. The flexible constricting assembly 422 also includes a first inner ring 430 and a second inner ring 434 that are moveable with respect to one another as described in further detail below. The flexible constricting assembly 422 also includes a coupling member 438 coupled to a side of the frame 202 opposite the channel member 426. The first inner ring 430 is pivotably coupled to the channel member 426 via a first pivot linkage 442, and the second inner ring 434 is pivotably coupled to the coupling member 438 via a second pivot linkage 446. In other embodiments, the coupling member 438 is omitted and the second inner ring 434 is pivotably coupled directly to the frame 202 via the second pivot linkage 446. The first inner ring 430 includes an opening 448 for the fish tape 196 to pass to and from the channel 428 of the channel member 426.

As shown in FIGS. 41 and 42, the flexible constricting assembly 422 also includes a plurality of constant force springs 450 that are respectively rotatably mounted on posts 454 arranged on the first and second inner rings 430, 434. The constant force springs 450 mounted on the posts 454 of the first inner ring 430 are wrapped around the second inner ring 434 and have ends 458 that are coupled to the second inner ring 434 via fasteners 462. The constant force springs 450 mounted on the posts 454 of the second inner ring 434 are wrapped around the first inner ring 430 and have ends 458 that are coupled to first inner ring 430 via fasteners 462. As shown FIG. 42, the length of each constant force spring 450 is thus tensioned over the length of the first and second inner rings 430, 434. Therefore, the constant force springs 450 function to apply a constricting force on the first and second inner rings 430, 434, causing them to move toward each other, reducing the diameter of their combined circumference. In turn, the first and second inner rings 430, 434 bias the fish tape 196 radially inward toward the intermediate wall 350.

As the first and second inner rings 430, 434 are moved toward each other by the constant force springs 450, the first and second pivot linkages 442, 446 pivot radially inward. However, the flexible constrict assembly 442 is flexible, and thus, during a dispensing or retracting operation, as the fish tape 196 is dispensed or retracted into the fish tape drum 182, the fish tape 196 may tend to move radially outward in the fish tape drum 182, which in some embodiments can be due to the pin 266 and pushing members 414 biasing the fish tape 182 radially outward. Thus, as the fish tape 196 tends to move radially outward, the first and second inner rings 430, 434 expand against the biasing force of the constant force springs 450, and the first and second pivot linkages 442, 446 pivot radially outward to accommodate this expansion.

Therefore, the flexible constricting assembly 422 works together with the intermediate wall 350 to keep the fish tape 196 arranged in the limited space therebetween, but also accommodates the radial expansion and contraction of the fish tape 196 during dispensing and retracting operations. For example, without the flexible constricting assembly 422, when starting a dispensing operation, the fish tape 196 tends to radially expand toward the outer wall 262 of the drum portion 186. During this radial expansion, the fish tape 196 tends to tangle because of the large volume of free space between the intermediate wall 350 and the outer wall 262. In contrast, when the flexible constricting assembly 422 is included with the fish tape drum 182, the flexible constrict assembly prevents said radial expansion, and thus inhibits tangling of the fish tape 196.

Figure 44:
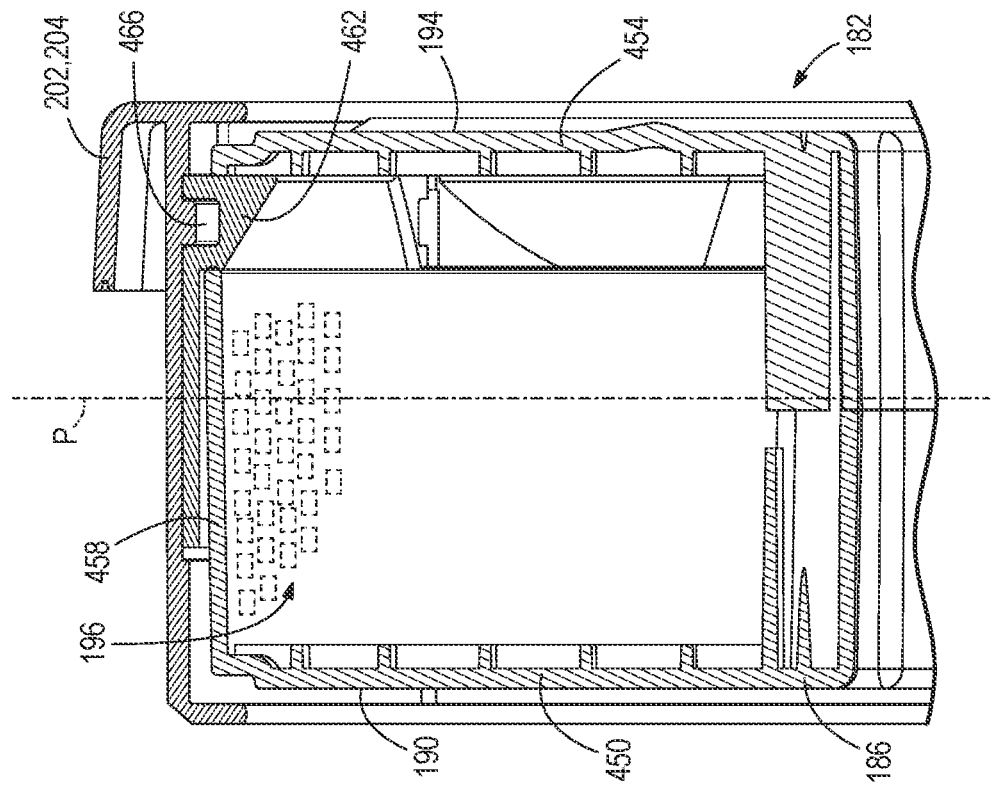
FIG. 44 is a cross-sectional view of the fish tape drum of FIG. 43.
Figure 43:
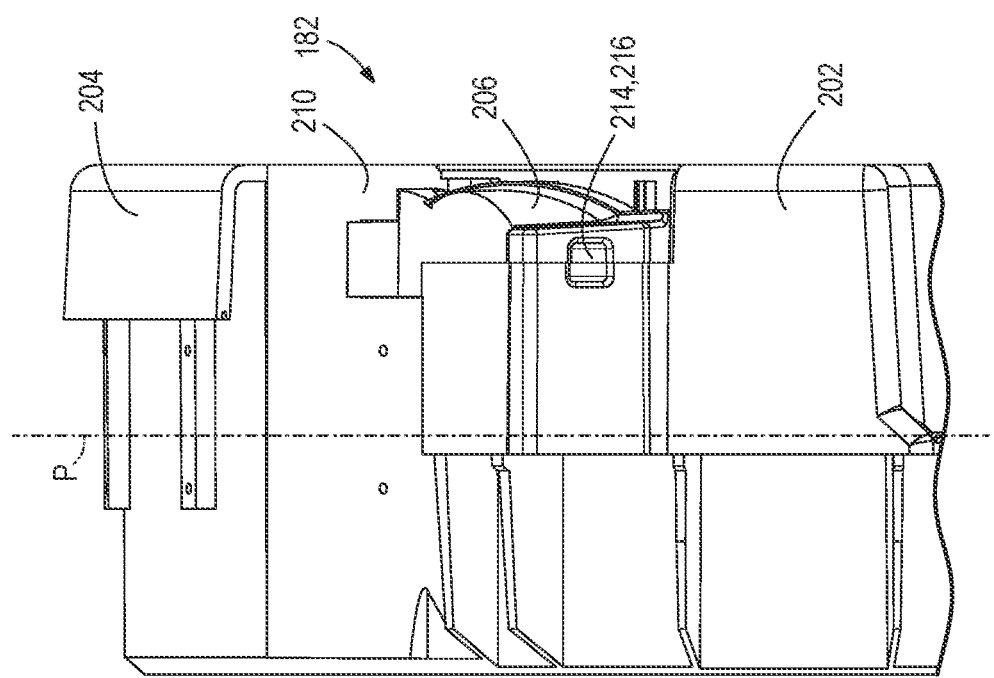
FIG. 43 is an enlarged plan view of a fish tape drum according to another embodiment of the invention.

In some embodiments, as shown in FIGS. 43 and 44, the first and second clamshells 190, 194 respectively include first and second sidewalls 450, 454 of the drum portion 186, and the first and second clamshells 190, 194 together define a circumferential wall 458 extending between the first and second sidewalls 450, 454. A central plane P is defined at a location that is equidistant from the first and second sidewalls 450, 454. In the embodiment of FIGS. 43 and 44, the nozzle 206, nozzle channel 214, and exit 216 of the frame 202 are all shifted to one side of the frame 202, such that they are all offset from the central plane P and proximate the second sidewall 454, rather than being intersected by the central plane P, as in the embodiments of FIGS. 14-19, 26, 27, and 31-33. Also, instead of locating the separator rib 222 and rib channel 230 (e.g. as shown in FIG. 15) of the frame 202, such that they are intersected by the central plane P, the frame 202 of the embodiment of FIGS. 43 and 44 includes an angled rib 462 and a lead channel 466 that are both offset from the central plane P and proximate the second sidewall 454. The lead channel 466 is in communication with the nozzle channel 214, such that like the rib channel 230 of FIG. 15, the lead channel 466 of FIGS. 43 and 44 is configured to permit the fish tape 196 to pass between the drum portion 186 and the nozzle channel 214.

By arranging the lead channel 466 and angled rib 462 to be offset from the central plane P and proximate the second sidewall 454, rather than being intersected by the central plane P, all of the fish tape 196 is arranged to one side of the angled rib 462 and the fish tape 196 is thus less likely to become tangled as it enters and exits the lead channel 466. In contrast, in the embodiments of FIGS. 14-19, 26, 27, and 31-33, with the centrally located separator rib 222 and rib channel 230, the layers of fish tape 196 are randomly arranged on both sides of the centrally located separator rib 222, tending to cause the layers of fish tape 196 to become obstructed when the fish tape 196 is fed to the rib channel 230.

Figure 45:
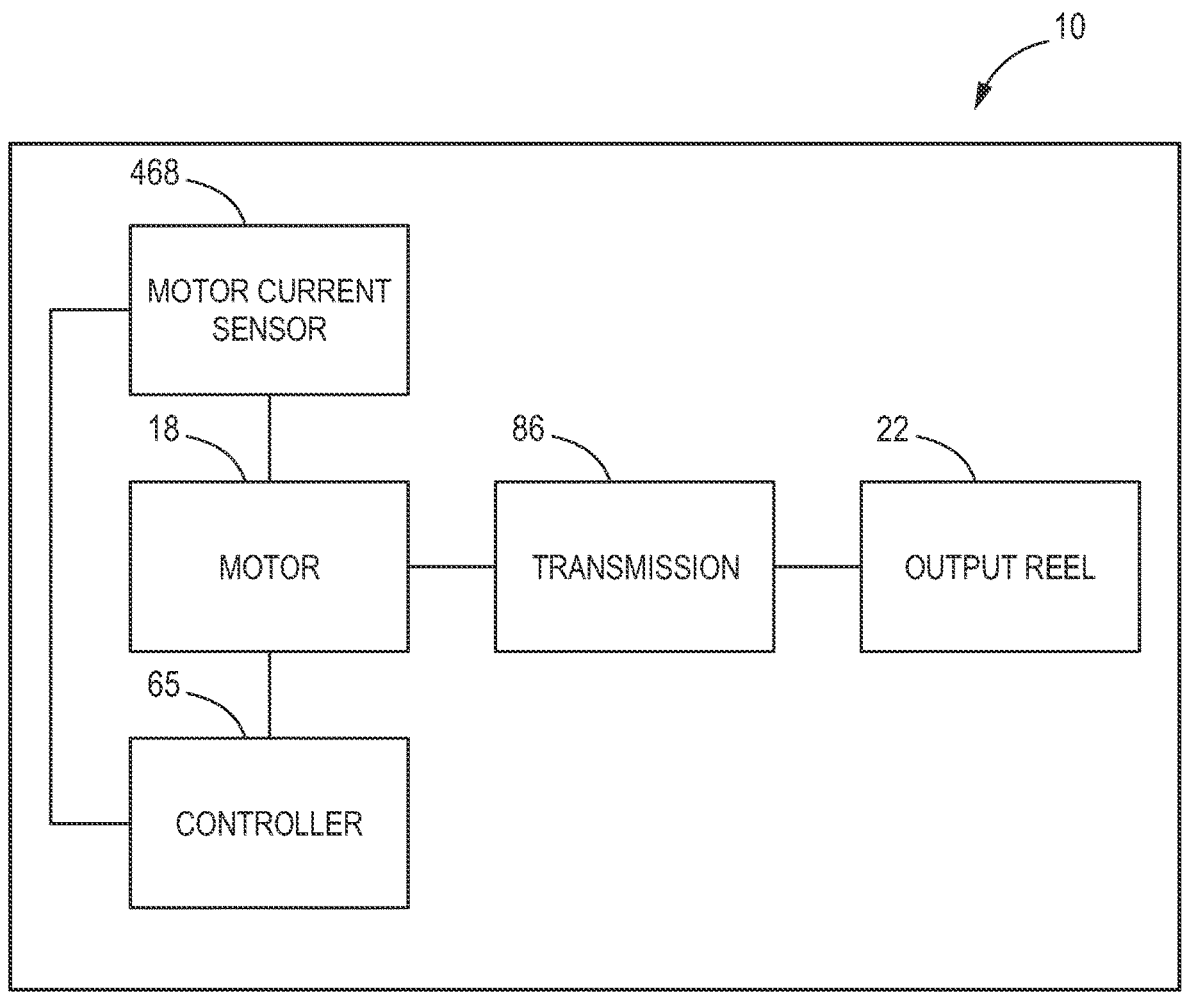
FIG. 45 is a schematic view of a fish tape tool according to another embodiment of the invention.

As shown schematically in FIG. 45, in some embodiments, any of the fish tape tools 10 can include a motor current sensor 468 that is in electrical communication with the motor 18 and the controller 65, which is also in electrical communication with the motor 18. The motor current sensor 468 is configured to monitor current drawn by the motor 18 during a dispensing operation. During the dispensing operation, in response to the motor current sensor 468 detecting that the current drawn by the motor 18 is above a predetermined motor current threshold for a predetermined window of time, or instantaneously, the controller 65 deactivates the motor 18. The predetermined motor current threshold may be representative of an impending fish tape failure (e.g. a tangle) during the dispensing operation. For example, the predetermined motor current threshold may be a current that is 10% greater than the motor current during normal operating conditions. Once the motor 18 is deactivated, the motor 18 can be reactivated in a retracting direction to retract the fish tape for a period of time before beginning another dispensing operation, thus potentially fixing the tangle. In some embodiments, motor current sensor 468 may also be configured to monitor current drawn by the motor 18 during a retraction operation. In that embodiment, the motor current sensor 468 may detect that the current drawn by the motor 18 is above a predetermined threshold for a predetermined window of time, or instantaneously, and send a signal to the controller 65 to deactivate the motor 18.

The rotation of the fish tape drum in a first direction causes the fish tape to be dispensed, and the rotation of the fish tape drum in a second direction causes the fish tape to be retracted. In some embodiments, the described configuration of a motor current sensor and a controller may be configured to deactivate the motor only when the fish tape drum is rotating in the first direction.

Figure 46:
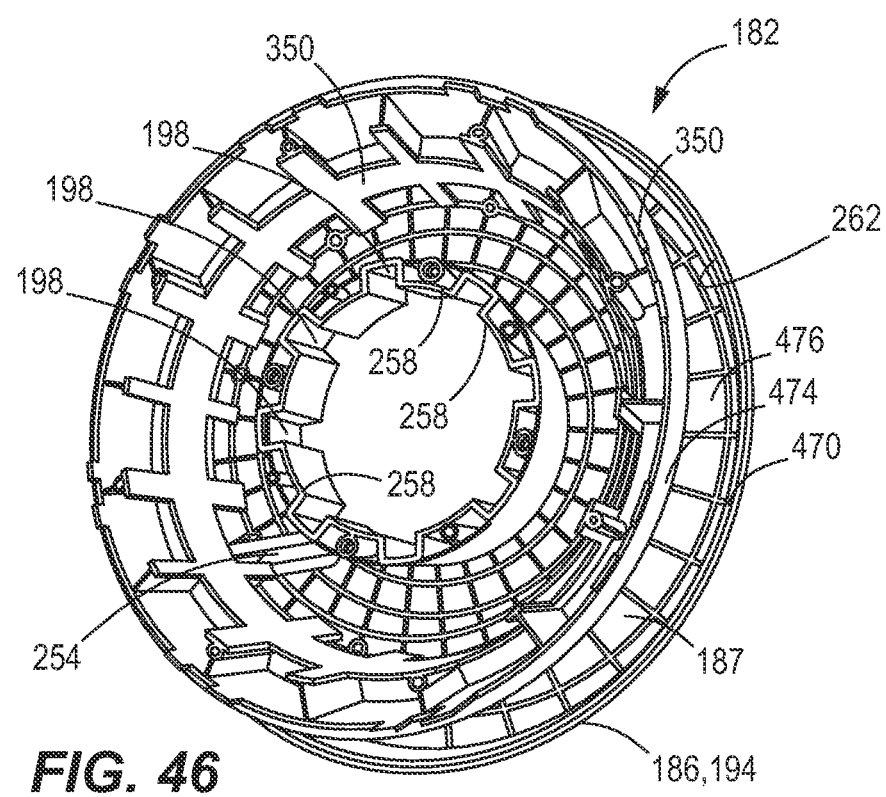
FIG. 46 is a perspective view of a fish tape drum according to another embodiment of the invention, with portions removed.

As shown in FIG. 46, the drum portion 186 of the fish tape drum 182 includes the first and second clamshells 190, 194 (only the second clamshell 194 is shown in FIG. 46). The drum portion 186 defines an interior portion 187. The interior portion 187 may also be referred to as a fish tape storage zone. The interior portion 187 is defined by the outer wall 262, the intermediate wall 350, and an inner axial surface 476 of both the first and second clamshells 190, 194. The outer wall 262, the intermediate wall 350, and the inner axial surface 476 are formed of a first material. The first material has a first coefficient of friction. The first material may be, for example, plastic. In some embodiments, the outer wall 262, the intermediate wall 350, and the inner axial surface 476 are formed of the same material. In other embodiments, the outer wall 262, the intermediate wall 350, and the inner axial surface 476 may be formed of different materials. In such embodiments, the outer wall 262, the intermediate wall 350, and the inner axial surface 476 may have the same coefficient of friction or different coefficients of friction. The fish tape 196 is positioned at least partially within the interior portion 187.

In some embodiments, a friction layer may be coupled to an inner surface of the fish tape drum 182. For example, the inner surface may be a surface of the outer wall 262, may be a surface of the intermediate wall 350, and/or may be the inner axial surface 476. In the illustrated embodiment, a first friction layer 470 is coupled to the inner surface of the outer wall 262, and a second friction layer 474 is coupled to the inner surface of the intermediate wall 350. The first friction layer 470 and the second friction layer 474 each have a second coefficient of friction. The second coefficient of friction is greater than the first coefficient of friction. As such, the first and second friction layers 470, 474 increase friction against the fish tape 196 within the drum portion 186 (compared to a drum without friction layers) so as to increase the efficacy of the drum portion 186 in moving the fish tape 196 out of the fish tape drum 182 during a dispensing operation. For example, as the drum portion 186 is rotating during a dispensing operation, the first and second friction layers 470, 474 frictionally engage the fish tape 196 to cause it to be "pulled" out of the fish tape drum 182. This is in contrast to an embodiment (e.g., FIG. 33) in which the first and second friction layers 470, 474 are omitted, and the outer and intermediate walls 262, 350 formed of the first material are not as effective at frictionally engaging the fish tape 196 to move the fish tape 196 out of the fish tape drum 182.

The first friction layer 470 may be on any portion of or the entirety of the outer wall 262. Similarly, the second friction layer 474 may be on any portion or the entirety of the intermediate wall 350. In some embodiments, the first friction layer 470 and/or the second friction layer 474 may also be on other portions of the fish tape drum 182. Specifically, the inner axial surface 476 may include the first friction layer 470 or the second friction layer 474.

In some embodiments, the first friction layer 470 and the second friction layer 474 are rubber. In other embodiments, the first friction layer 470 and/or the second friction layer 474 could be any material with a higher coefficient of friction than the first material. In some embodiments, the first friction layer 470 and the second friction layer 474 are coated onto the outer and intermediate walls 258, 350. In other embodiments, the first friction layer and the second friction layer 474 are separate members that are secured (e.g., glued, fastened, etc.) onto the outer and intermediate walls 258, 350. In some embodiments, in addition to the outer and intermediate walls 262, 350, the first and second friction layer 470, 474 are applied to more locations in the drum portion 186, such as the inner axial faces 476 of the first and second clamshells 190, 194.

In some embodiments, different portions of the fish tape drum 182 may be made of multiple different materials having different coefficients of friction. For example, intermediate wall 350 may be made of a second material having a third coefficient of friction, and the outer wall 262 may be made of the first material having the first coefficient of friction. As a result, in the absence of a friction coating such as the first friction layer with the second coefficient of friction, the two surfaces may have different coefficients of friction with both coefficients of friction being too small to effectively dispense the fish tape 196 when the drum portion 186 is rotated. In that situation, the first friction layer 470 (having a higher coefficient of friction than one, some, or all of the multiple different materials having different coefficients of friction comprising the fish tape drum 182) could be applied to any portion of the boundaries of the fish tape storage zone inside the fish tape drum 182 to increase frictional engagement with the fish tape 196.

In some embodiments, multiple different materials in addition to the first and second friction layers 470, 474 could be used inside the fish tape drum 182 to provide a sufficiently high coefficient of friction on at least a portion of the boundary of the fish tape storage zone. For example, a first portion of the boundary of the fish tape storage zone could be provided with a first friction layer having the second coefficient of friction to increase friction against the fish tape 196 within the drum portion 186, so as to increase the efficacy of the drum portion 186 in moving the fish tape 196 out of the fish tape drum 182 during a dispensing operation, and a second portion of the boundary of the fish tape storage zone could be provided with a second friction layer having a fourth coefficient of friction also configured to increase friction against the fish tape 196 within the drum portion 186, so as to increase the efficacy of the drum portion 186 in moving the fish tape 196 out of the fish tape drum 182 during a dispensing operation. The fourth coefficient of friction of the second friction layer could be greater than, less than, or substantially equal to the second coefficient of friction of the first friction layer. The friction layers may be made of rubber or other materials or other materials with a relatively high coefficient of friction compared to plastic and other similar materials that may be used to make portions of the fish tape drum 182.

Note that although this detailed description refers to some materials numerically (e.g., "first material," "first coefficient of friction," etc.), this is not intended to imply that the materials must be applied to the fish tape drum 182 in any particular order during manufacturing.

Figure 47:
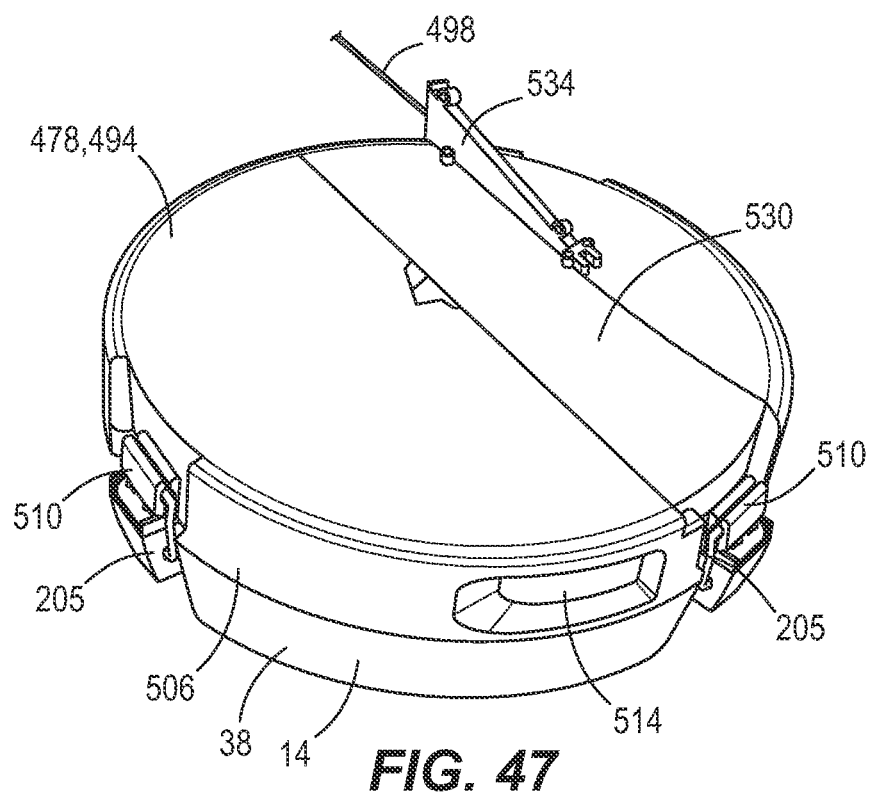
FIG. 47 is a perspective view of a fish tape drum according to another embodiment of the invention.
Figure 48:
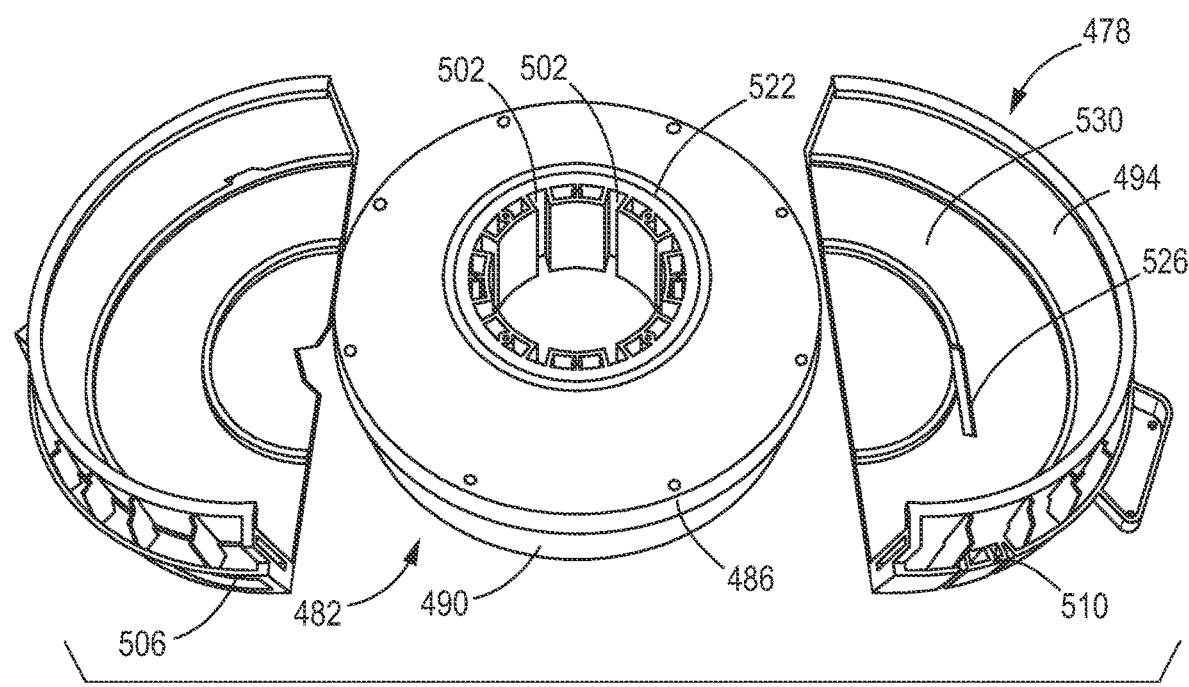
FIG. 48 is an exploded view of the fish tape drum of FIG. 47.
Figure 49:
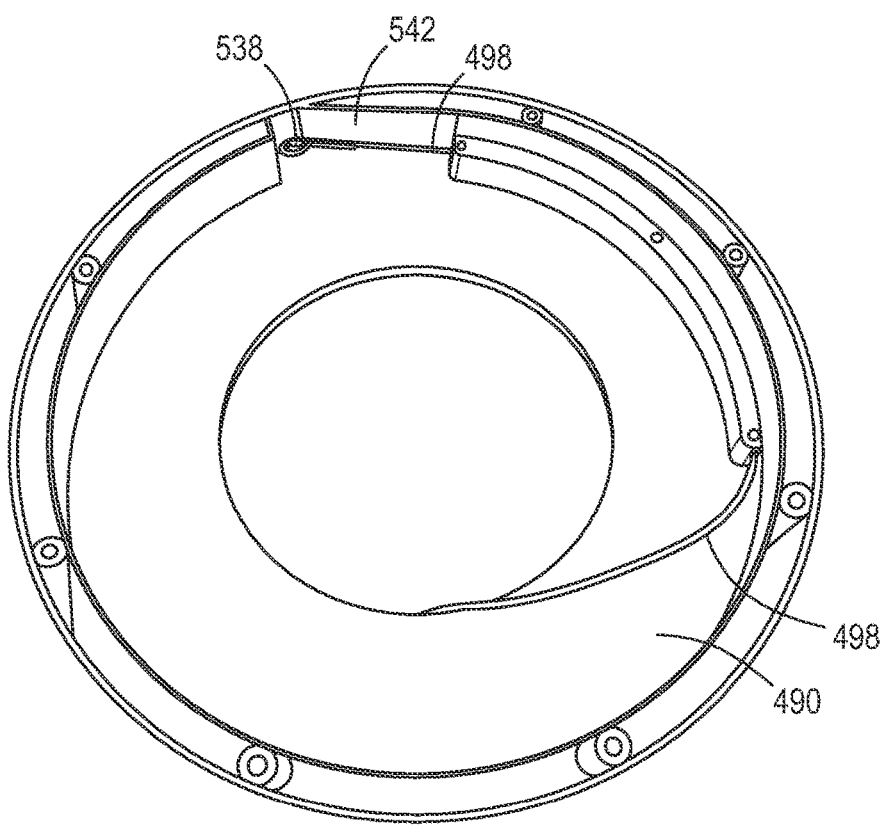
FIG. 49 is a perspective view of a drum portion of the fish tape drum of FIG. 47, with portions removed.

FIGS. 47-49 illustrate a different embodiment of fish tape drum 478 configured to be used with the fish tape tool 10 of FIG. 32. The fish tape drum 478 includes a drum portion 482 (FIG. 4) including first and second clamshells 486, 490 which include drum sidewalls that generally lie in a plane perpendicular to the axis of rotation of the fish tape drum 478. The first and second clamshells 486, 490 are each separately and rotatably supported by a housing 494 of the fish tape drum 478. A length of fish tape 498 is retained between the first and second clamshells 486, 490 of the drum portion 482. The first clamshell 486, 490 of the drum portion 482 defines a radially outward-extending recesses 502 that serve the same function as the radially outward-extending recesses 198 of the drum portion 482 and the recesses 150 of the drum portion 138 of fish tape drum 30. The first and second clamshells 486, 490 of the drum portion 482 are jointly rotatable relative to the housing 494 in order to dispense or retract the fish tape 498 from or into the fish tape drum 478. In the illustrated embodiment, the first and second clamshells 486, 490 are jointly rotatable in the same manner that the first and second clamshells 486, 490 of the drum portion 482 are jointly rotatable relative to the frame 202. The first and second clamshells 486, 490 are also rotatable in the same manner that the drum portion 138 is rotatable relative to the frame 158 of the fish tape drum 30.

The housing 494 includes a shelf portion 506 that functions in the same manner as the shelf portion 204 of fish tape drum 478. The shelf portion 506 includes hooks 510 engageable by the latches 205. The shelf portion 506 also includes gripping recesses 514 graspable by the operator to insert the fish tape drum 478 into or remove the fish tape drum 478 from the interior chamber 50 of the fish tape tool 10. The output reel 22 can rotate the drum portion 482 of the fish tape drum 478 directly, via the arrangement of legs 78 of the output reel 22 in the recesses 502 of the drum portion 482.

As shown in FIG. 48, the first clamshell 486 of the drum portion 482 includes an annular aperture 522 for dispensing and retracting the fish tape 498 from the drum portion 482. The drum portion 482 is annular shaped and has an inner diameter and an outer diameter. In some embodiments, the annular aperture 522 is nearer to the inner diameter (in other words, nearer to recesses 502) than to the outer diameter (in other words, to the outer layer 470) of the drum portion 482. The annular aperture 522 is a continuous aperture. The annular aperture 522 is radially aligned with an exit aperture 526 extending along an axial surface 530 of the housing 494. The fish tape 498 exits the fish tape drum 182 by passing through the annular aperture 522 and the exit aperture 526. As shown in FIG. 47, a nozzle 534 extends from the axial surface 530 of the housing 494 and surrounds a portion of the exit aperture 526, such that the fish tape 498 may be dispensed from and retracted into the nozzle 534. The nozzle 534 is configured to direct the fish tape into and out of the exit aperture 526. In some embodiments, the nozzle 534 may be omitted.

As shown in FIG. 49, the fish tape 498 includes an anchor end 538 that is secured on an inner outside wall 542 of the drum portion 482 and more specifically, the second clamshell 490, thereby inhibiting "back-wind" and inhibiting the fish tape 498 from fouling when the fish tape 498 is dispensed under load. The fish tape 498 includes a free end opposite the anchor end that is not anchored and is configured to be dispensed through and retracted into the annular aperture 522 and the exit aperture 526.

In operation of the embodiment of FIGS. 47-49, the fish tape drum 478 is loaded into the interior chamber 50 of the fish tape tool 10 of FIG. 32. The latches 205 are then used to secure the housing 494 to the housing 14 of the fish tape tool 10. The motor 18 is then activated, rotating output reel 22 and thus rotating the drum portion 482 relative to the housing 494 about an axis that is generally perpendicular to the axial surface 530 of housing 494. The drum portion 482 may be rotated in a first direction to dispense the fish tape, and the drum portion 482 may be rotated in a second direction to retract the fish tape. As the drum portion 482 is rotated in the first direction, the fish tape 498 is dispensed through the annular aperture 522 of the first clamshell 486, through the exit aperture 526 in the axial surface 530 of the housing 494 and through the nozzle 534. As the drum portion 482 is rotated in the second direction, the fish tape 498 is retracted through the nozzle 534, through the exit aperture 526 in the axial surface 530 of the housing 494, and into the annular aperture 522 of the first clamshell 486.

Although the invention has been described in detail with reference to certain preferred embodiments, variations and modifications exist within the scope and spirit of one or more independent aspects of the invention as described.

What is claimed is:

1. A fish tape tool, comprising:
   a housing;
   a drum supported by the housing for rotation relative to the housing, the drum including an inner surface that at least partially defines a fish tape storage zone, the inner surface being made of a first material having a first coefficient of friction;
   a fish tape positioned at least partially within the fish tape storage zone of the drum, the fish tape being dispensed or retracted from the drum as the drum rotates; and
   a friction layer positioned on at least a portion of the inner surface of the drum, the friction layer having a second coefficient of friction that is greater than the first coefficient of friction.

2. The fish tape tool of claim 1, wherein the drum includes an intermediate member that forms a radially inner boundary of the fish tape storage zone, and wherein the inner surface is a surface of the intermediate member.

3. The fish tape tool of claim 1, wherein the drum includes a circumferential outer wall and a sidewall, wherein the circumferential wall forms a radially outer boundary of the fish tape storage zone, and wherein the inner surface is a surface of the circumferential outer wall, the sidewall, or both.

4. The fish tape tool of claim 3, wherein the drum includes an intermediate member that forms a radially inner boundary of the fish tape storage zone, and wherein the intermediate member is made of a second material having a third coefficient of friction that is less than the second coefficient of friction.

5. The fish tape tool of claim 4, further comprising a second friction layer on at least a portion of a surface of the intermediate member that forms the radially inner boundary of the fish tape storage zone, wherein the second friction layer has a fourth coefficient of friction that is greater than the third coefficient of friction.

6. The fish tape tool of claim 5, wherein the second coefficient of friction is substantially equal to the fourth coefficient of friction.

7. The fish tape tool of claim 1, wherein the friction layer is positioned on an entirety of the inner surface that defines the fish tape storage zone.

8. The fish tape tool of claim 1, wherein the friction layer is rubber.

9. The fish tape tool of claim 1, further comprising a motor supported by the housing and coupled to the drum, wherein the motor is operable to rotate the drum.

10. The fish tape tool of claim 9 further comprising:
a motor current sensor coupled to the motor, the motor current sensor configured to measure a current drawn by the motor while the motor rotates the drum; and
a controller coupled to the motor current sensor, the controller configured to deactivate the motor when the motor current sensor measures a current that exceeds a predetermined value.

11. The fish tape tool of claim 1, wherein the housing includes a housing sidewall having an exit aperture, wherein the drum is rotatable relative to the housing about an axis that is generally perpendicular to the housing sidewall to dispense or retract the fish tape, and wherein the drum includes
a circumferential outer wall,
a drum sidewall extending generally perpendicular to the axis, and
an annular aperture formed in the drum sidewall and aligned with the exit aperture such that the fish tape can be dispensed and retracted through the annular aperture and the exit aperture.

12. A fish tape tool, comprising:
a fish tape;
a housing including a housing sidewall having an exit aperture;
a drum positioned within the housing, the drum receiving at least a portion of the fish tape, the drum being rotatable relative to the housing about an axis that is generally perpendicular to the housing sidewall to dispense or retract the fish tape, the drum including
a circumferential outer wall,
a drum sidewall extending generally perpendicular to the axis, and
an annular aperture formed in the drum sidewall and aligned with the exit aperture such that the fish tape can be dispensed and retracted through the annular aperture and the exit aperture.

13. The fish tape tool of claim 12, wherein the drum is annular-shaped and has an inner diameter and an outer diameter, and wherein the annular aperture is adjacent the inner diameter.

14. The fish tape tool of claim 12, wherein the fish tape includes an anchor end and a free end opposite the anchor end, and wherein the anchor end is secured to an inner wall of the drum.

15. The fish tape tool of claim 12, wherein the housing includes a nozzle surrounding a portion of the exit aperture, and wherein the nozzle is configured to direct the fish tape into and out of the exit aperture.

16. The fish tape tool of claim 12, wherein rotation of the drum in a first direction dispenses the fish tape and rotation of the drum in a second direction retracts the fish tape.

17. A fish tape tool, comprising:
a motor;
a drum coupled to the motor, the drum operable to be rotated by the motor;
a fish tape positioned at least partially within the drum, the fish tape being dispensed or retracted from the drum as the drum rotates;
a motor current sensor coupled to the motor and configured to measure a current drawn by the motor while the motor rotates the drum; and
a controller coupled to the motor current sensor, the controller configured to deactivate the motor when the motor current sensor measures a current that exceeds a predetermined value,
wherein the drum rotates in a first direction to dispense the fish tape and rotates in a second direction to retract the fish tape,
wherein the controller is configured to deactivate the motor when the drum is rotating in the first direction, and
wherein the motor is configured to be reactivated by operating the motor in the second direction.

18. The fish tape tool of claim 17, wherein the controller is configured to deactivate the motor only when the drum is rotating in the first direction.

\* \* \* \* \*